United States Patent
Welker et al.

(10) Patent No.: US 12,486,379 B2
(45) Date of Patent: Dec. 2, 2025

(54) USE OF A POROUS FILLER FOR REDUCING THE GAS PERMEABILITY OF AN ELASTOMER COMPOSITION

(71) Applicant: OMYA INTERNATIONAL AG, Oftringen (CH)

(72) Inventors: Matthias Welker, Hésingue (FR); Samuel Rentsch, Spiegel bei Bern (CH)

(73) Assignee: OMYA INTERNATIONAL AG, Oftringen (CH)

( * ) Notice: Subject to any disclaimer, the term of this patent is extended or adjusted under 35 U.S.C. 154(b) by 329 days.

(21) Appl. No.: 18/011,937

(22) PCT Filed: Jul. 15, 2021

(86) PCT No.: PCT/EP2021/069700
§ 371 (c)(1),
(2) Date: Dec. 21, 2022

(87) PCT Pub. No.: WO2022/013336
PCT Pub. Date: Jan. 20, 2022

(65) Prior Publication Data
US 2023/0235151 A1    Jul. 27, 2023

(30) Foreign Application Priority Data

Jul. 16, 2020   (EP) .................................... 20186206

(51) Int. Cl.
| | |
|---|---|
| C08K 3/26 | (2006.01) |
| C08K 7/24 | (2006.01) |
| C08K 9/04 | (2006.01) |
| C09C 3/08 | (2006.01) |

(52) U.S. Cl.
CPC .................. *C08K 9/04* (2013.01); *C08K 3/26* (2013.01); *C08K 7/24* (2013.01); *C09C 3/08* (2013.01); *C08K 2003/265* (2013.01); *C08K 2201/002* (2013.01); *C08K 2201/005* (2013.01); *C08K 2201/006* (2013.01)

(58) Field of Classification Search
CPC ... C08K 9/04; C08K 3/26; C08K 7/24; C08K 2003/265; C08K 2201/002; C08K 2201/006; C08K 2003/267; C08K 2201/005; C09C 3/08
USPC .......................................................... 523/218
See application file for complete search history.

(56) References Cited

U.S. PATENT DOCUMENTS

| | | |
|---|---|---|
| 935,418 A | 9/1909 | Sisson |
| 1,361,324 A | 12/1920 | Grunwald |
| 3,374,198 A | 3/1968 | Luigi et al. |
| 3,897,519 A | 7/1975 | Hogberg et al. |
| 4,126,650 A | 11/1978 | Via et al. |
| 4,350,645 A | 9/1982 | Kurosaki et al. |
| 4,921,990 A | 5/1990 | Uphues et al. |
| 5,554,781 A | 9/1996 | Reierson |
| 5,979,461 A | 11/1999 | Bensalem et al. |
| 6,710,199 B2 | 3/2004 | Tsuyutani et al. |
| 2004/0020410 A1 | 2/2004 | Gane et al. |
| 2004/0097616 A1 | 5/2004 | Doppler et al. |
| 2008/0022901 A1* | 1/2008 | Buri ........................ C09C 1/021 524/400 |
| 2012/0153239 A1* | 6/2012 | Chandrasekhar .... H05K 9/0083 252/514 |
| 2018/0258245 A1 | 9/2018 | Zauner et al. |

FOREIGN PATENT DOCUMENTS

| | | |
|---|---|---|
| CN | 109280510 A | 1/2019 |
| EP | 1 092 000 B1 | 9/2004 |
| EP | 1 712 523 A1 | 10/2006 |
| EP | 1 712 597 A1 | 10/2006 |
| EP | 2 264 108 A1 | 12/2010 |
| EP | 2 264 109 A1 | 12/2010 |
| EP | 2 371 766 A1 | 10/2011 |
| EP | 2 447 213 A1 | 5/2012 |
| EP | 2 524 898 A1 | 11/2012 |
| EP | 2 770 017 A1 | 8/2014 |
| EP | 3 192 837 A1 | 7/2017 |
| EP | 3 540 006 A1 | 9/2019 |
| GB | 544907 A | 5/1942 |
| GB | 548197 A | 9/1942 |
| WO | 00/39222 A1 | 7/2000 |
| WO | 2004/083316 A1 | 9/2004 |
| WO | 2005/121257 A2 | 12/2005 |
| WO | 2008/023076 A1 | 2/2008 |
| WO | 2009/074492 A1 | 6/2009 |
| WO | 2011/054831 A1 | 5/2011 |
| WO | 2013/142473 A1 | 9/2013 |
| WO | 2015/097031 A1 | 7/2015 |
| WO | 2016/023937 A1 | 2/2016 |

OTHER PUBLICATIONS

Oct. 29, 2021 International Search Report issued in International Patent Application No. PCT/EP2021/069700.
Oct. 29, 2021 Written Opinion issued in International Patent Application No. PCT/EP2021/069700.

* cited by examiner

*Primary Examiner* — Hannah J Pak
(74) *Attorney, Agent, or Firm* — Oliff PLC

(57) ABSTRACT

A porous filler for reducing the gas permeability of an elastomer composition, a process for producing the elastomer composition comprising the porous filler, and the elastomer composition itself. The porous filler is selected from surface-reacted calcium carbonate, precipitated hydromagnesite and mixtures thereof. The addition of the porous filler to the elastomer composition allows for reducing the gas permeability of the elastomer composition while retaining or improving the mechanical properties of the elastomer composition.

25 Claims, No Drawings

USE OF A POROUS FILLER FOR REDUCING THE GAS PERMEABILITY OF AN ELASTOMER COMPOSITION

The present invention relates to the use of porous fillers for reducing the gas permeability of an elastomer composition, a process for the production of an elastomer composition having a reduced gas permeability, an elastomer composition having a reduced gas permeability, and articles comprising an elastomer composition providing a reduced gas permeability.

Elastomers, also commonly termed rubbers, are cross-linked polymeric materials having rubber-like elasticity, i.e., the ability of reversible deformation upon application of an external deforming force. Elastomers have found widespread application, for example in tires, tubeless tires, O-rings, disposable gloves, automotive transmission belts, hoses, gaskets, oil seals, V belts, synthetic leather, printers form rollers, cable jacketing, pigment binders, adhesives, sealants, dynamic and static seals, conveyor belts, or sanitary applications.

For certain applications, such as in tubeless tires, medical applications, shoe soles, or O-rings, it is desirable that the elastomer has a low gas permeability, for example in order to prevent the intrusion of oxygen and moisture into vacuum and/or inert gas atmospheres, or in order to prevent or retard a pressure loss in gas-filled devices under excess pressure. However, it is also a requirement that the elastomer at the same time has good mechanical properties, which allow them to withstand the challenging requirements of such applications.

It is common in the art to add certain fillers to the elastomer compositions, for example, in order to improve the mechanical properties. Commonly employed reinforcing fillers include carbon black, modified silica particles, kaolin and other clays. However, the use of these fillers often leads to high gas permeabilities of the filled elastomer composition, which is unwanted. In order to reduce the gas permeability, talcs or silanised talcs may be added to the elastomer compositions. These fillers, however, do not act as reinforcing fillers or may even weaken the elastomer structure. Nanofillers have also been suggested as fillers for elastomers, although their handling is difficult due to health safety and environmental concerns.

The use of ground calcium carbonate and precipitated calcium carbonate in elastomer compositions has been reported. For example, U.S. Pat. No. 3,374,198 discloses compositions comprising ethylene-propylene rubbers and calcium carbonate as a reinforcing filler. Sobhy et al. (Egyptian Journal of Solids 2003, 26, 241-257) report on the cure characteristics and mechanical properties of natural rubber and nitrile rubber filled with calcium carbonate.

EP 3 192 837 A1 refers to a surface-modified calcium carbonate, which is surface-treated with an anhydride or acid or salt thereof, and suggests its use inter alia in polymer compositions, papermaking, paints, adhesives, sealants, pharma applications, crosslinking of rubbers, polyolefins, polyvinyl chlorides, in unsaturated polyesters and in alkyd resins.

However, none of the prior art suggests a filler, which, when present in an elastomer composition, can be used for specifically reducing the gas permeability of said elastomer composition, while retaining or improving its mechanical properties, e.g., in order to maintain or provide a preferable high level of reinforcement.

Therefore, there is still a need in the art for filler-containing elastomer compositions having a reduced gas permeability, while preferably the mechanical properties of the elastomer compositions are retained or improved.

Accordingly, it is an objective of the present invention to provide a filler for use in an elastomer composition, which reduces the gas permeability of said elastomer composition, while preferably the mechanical properties of the elastomer composition are retained or improved. Preferably, the filler is easy to handle.

These and other objectives of the present invention can be solved by the use of the inventive porous filler in an elastomer composition, a process for the preparation of an elastomer composition comprising a porous filler, as well as an elastomer composition comprising a porous filler as described in the present invention and defined in the claims.

SUMMARY OF THE INVENTION

According to one aspect of the present invention, the use of a porous filler for reducing the gas permeability of an elastomer composition comprising an elastomer is provided, wherein the porous filler comprises a filler material selected from the group consisting of surface-reacted calcium carbonate, precipitated hydromagnesite and mixtures thereof, and wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source and mixtures thereof.

The inventors surprisingly found that by the use of a porous filler according to the first aspect of the invention, the gas permeability of an elastomer composition can be reduced, i.e., the amount of a gas, for example air, which diffuses through the elastomer during a fixed time is reduced. In addition thereto, the mechanical properties of the elastomer composition comprising the porous filler remain unaffected or are improved. According to the present invention, the reduction in gas permeability and improvement in mechanical properties can be reflected by comparing an elastomer composition comprising the inventive porous filler with an otherwise identical composition, which, however, comprises an isovolumic amount of carbon black instead of the inventive porous filler. The carbon black of the comparative composition has a statistical thickness surface area (STSA) of 39±5 $m^2/g$, measured according to ASTM D 6556-19. It is to be understood that the elastomer composition comprising the inventive porous filler has a reduced gas permeability, which may alternatively be reflected by a comparison to an otherwise identical composition, which does not comprise any filler. Thus, the inventive filler may be used for reducing the gas permeability of an elastomer composition either by adding the inventive filler to an elastomer composition not comprising any filler or by replacing a certain amount of a conventional filler (e.g., carbon black) in an elastomer composition comprising said conventional filler.

According to a preferred embodiment of the present invention, the filler material has
- a BET specific surface area from 20 to 200 $m^2/g$, preferably 40 to 150 $m^2/g$, more preferably 70 to
- a volume median particle size $d_{50}$ from 0.1 to 75 µm, preferably from 0.5 to 50 µm, more preferably from 1 to 40 µm, even more preferably from 1.2 to 30 µm, and most preferably from 1.5 to 15 µm; and/or
- a volume top cut particle size $d_{98}$ from 0.2 to 150 µm, preferably from 1 to 100 µm, more preferably from 2 to 80 µm, even more preferably from 2.4 to 60 µm, and most preferably from 3 to 30 µm;

and/or an intra-particle intruded specific pore volume in the range from 0.1 to 3.0 cm$^3$/g, more preferably from 0.2 to 2.5 cm$^3$/g, still more preferably from 0.4 to 2.0 cm$^3$/g and most preferably from 0.6 to 1.8 cm$^3$/g, determined by mercury porosimetry measurement.

According to a further preferred embodiment of the present invention, the porous filler further comprises a surface-treatment layer on at least a part of the surface of the filler material, wherein the surface-treatment layer is formed by contacting the filler material with a surface-treatment composition in an amount from 0.07 to 9 mg/m$^2$ of the filler material surface, preferably 0.1 to 8 mg/m$^2$, more preferably 0.11 to 3 mg/m$^2$.

It was found that the presence of a surface-treatment layer on the surface of the filler material improves the dispersion of the porous filler within the elastomer composition and improves the chemical compatibility. The mechanical properties of the elastomer composition may benefit from an improved dispersion of the porous filler. In addition thereto, the surface-treatment layer may be adapted for reacting with the elastomer precursor during formation of the elastomer composition, i.e., during the crosslinking step, which can further reduce the gas permeability and/or improve the chemical compatibility and/or the mechanical properties of the porous filler in the elastomer composition.

According to another preferred embodiment of the present invention, the surface-treatment composition comprises at least one unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof, preferably selected from the group consisting of a) sodium, potassium, calcium, magnesium, lithium, strontium, primary amine, secondary amine, tertiary amine and/or ammonium salts, whereby the amine salts are linear or cyclic, of mono- or di-substituted succinic acids, whereby one or both acid groups can be in the salt form, preferably both acid groups are in the salt form; unsaturated fatty acids, preferably oleic acid and/or linoleic acid; unsaturated esters of phosphoric acid; abietic acid and/or mixtures thereof, preferred are completely neutralized surface treatment agents; and/or b) a maleic anhydride grafted polybutadiene homopolymer or a maleic anhydride grafted polybutadiene-styrene copolymer and/or an acid and/or salt thereof, preferably a maleic anhydride grafted polybutadiene homopolymer having
  i) a number average molecular weight M$_n$ measured by gel permeation chromatography from 1 000 to 20 000 g/mol, preferably from 1 400 to 15 000 g/mol, and more preferably from 2 000 to 10 000 g/mol measured according to EN ISO 16014-1:2019, and/or
  ii) a number of anhydride groups per chain in the range from 2 to 12, preferably from 2 to 9, and more preferably from 2 to 6, and/or
  iii) an anhydride equivalent weight in the range from 400 to 2 200, preferably from 500 to 2 000, and more preferably from 550 to 1 800, and/or
  iv) an acid number in the range from 10 to 300 meq KOH per g of maleic anhydride grafted polybutadiene homopolymer, preferably 20 to 200 meq KOH/g, more preferably 30 to 150 meq KOH/g, measured according to ASTM D974-14, and/or
  v) a molar amount of 1,2-vinyl groups in the range from 5 to 80 mol-%, preferably 10 to 60 mol-%, more preferably 15 to 40 mol-%, based on the total amount of unsaturated carbon moieties in the maleic anhydride grafted polybutadiene homopolymer,
  and/or an acid and/or salt thereof.

The inventors surprisingly found that unsaturated carbon moieties can react with the elastomer precursor in a crosslinking step, e.g., a chemical crosslinking step. In this way, the porous filler may be covalently attached to the elastomer of the elastomer composition, which can further reduce the gas permeability and/or improve the chemical compatibility and the mechanical properties.

According to yet another embodiment of the present invention, the surface-treatment composition comprises or further comprises at least one saturated surface-treatment agent selected from the group consisting of I) a phosphoric acid ester blend of one or more phosphoric acid mono-ester and/or salts thereof and/or one or more phosphoric acid di-ester and/or salts thereof, and/or II) at least one saturated aliphatic linear or branched carboxylic acid and/or salts thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof and/or III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or IV) at least one polydialkylsiloxane, and/or V) at least one trialkoxysilane, preferably a sulfur-containing trialkoxysilane or an amino-containing trialkoxysilane and/or VI) mixtures of the materials according to I) to V).

The inventors found that the beneficial properties of a surface-treatment layer can be obtained also with saturated surface-treatment agents, or combinations of saturated surface-treatment agents with unsaturated surface-treatment agents.

According to a preferred embodiment of the present invention, the elastomer composition comprises an elastomer formed from an elastomer precursor selected from natural or synthetic rubbers, such as ethylene-propylene rubber, ethylene-propylene-diene rubber, nitrile-butadiene rubber, acrylonitrile-butadiene rubber, butyl rubber, styrene-butadiene rubber, polyisoprene, hydrogenated nitrile-butadiene rubber, polychloroprene, isobutene-isoprene rubber, chloro-isobutene-isoprene rubber, brominated isobutylene-isoprene rubber, acrylic rubbers, butadiene rubbers, epichlorhydrin rubbers, silicone rubbers, fluorocarbon rubbers, polyurethane rubbers, polysulfide rubbers, thermoplastic rubbers, and mixtures thereof.

According to still another embodiment of the present invention, the porous filler is contained in the elastomer composition in an amount in the range from 5 to 175 parts per hundred (phr), preferably from 10 to 160 parts per hundred, more preferably from 30 to 150 parts per hundred, based on the total weight of the elastomer precursor in the elastomer composition.

According to another preferred embodiment of the present invention, the elastomer composition further comprises additives, such as pigments, dyes, waxes, lubricants, oxidative- and/or UV-stabilizers, plasticizers, crosslinking agents, crosslinking coagents, compatibilizers, silanes, antioxidants, processing aids, further fillers and mixtures thereof.

According to still another preferred embodiment of the present invention, the Shore A hardness of the elastomer composition is increased, preferably by at least 3%, more preferably by at least 8%, compared to the same elastomer composition, wherein the porous filler is replaced by carbon black in an isovolumic amount, and/or the air permeability is decreased, preferably by at least 5%, more preferably at least 10%, and most preferably at least 15%, compared to the same elastomer composition, wherein the porous filler is replaced by carbon black in an isovolumic amount, wherein the carbon black has a statistical thickness surface area (STSA) of 39±5 m$^2$/g, measured according to ASTM D 6556-19, and wherein the Shore A hardness is measured according to NF ISO 7619-1:2010 and the air permeability is measured according to NF ISO 2782-1:2018.

According to a second aspect of the present invention, a process for the preparation of an elastomer composition having a reduced gas permeability is disclosed. The process comprises the steps of
a) providing a crosslinkable polymer,
b) providing a porous filler comprising a filler material selected from the group consisting of surface-reacted calcium carbonate, precipitated hydromagnesite and mixtures thereof,
    wherein the surface-reacted calcium carbonate is a reaction product of natural ground or precipitated calcium carbonate with carbon dioxide and one or more H$_3$O$^+$ ion donors in an aqueous medium, wherein the carbon dioxide is formed in situ by the H$_3$O$^+$ ion donor treatment and/or is supplied from an external source and mixtures thereof,
c) optionally providing a further filler preferably selected from the group consisting of carbon black, silica, ground natural calcium carbonate, precipitated calcium carbonate, talc, clay, kaolin, nanofillers and mixtures thereof,
d) mixing, in any order, the crosslinkable polymer of step a), the porous filler of step b) and optionally the second filler of step c) to form a mixture, and
e) crosslinking the mixture obtained in step d) to form an elastomer composition having a reduced gas permeability.

According to a preferred embodiment of the present invention, the filler material has
    a BET specific surface area from 20 to 200 m$^2$/g, preferably 40 to 150 m$^2$/g, more preferably 70 to 120 m$^2$/g; and/or
    a volume median particle size $d_{50}$ from 0.1 to 75 µm, preferably from 0.5 to 50 µm, more preferably from 1 to 40 µm, even more preferably from 1.2 to 30 µm, and most preferably from 1.5 to 15 µm; and/or
    a volume top cut particle size $d_{98}$ from 0.2 to 150 µm, preferably from 1 to 100 µm, more preferably from 2 to 80 µm, even more preferably from 2.4 to 60 µm, and most preferably from 3 to 30 µm; and/or
    an intra-particle intruded specific pore volume in the range from 0.1 to 3.0 cm$^3$/g, more preferably from 0.2 to 2.5 cm$^3$/g, still more preferably from 0.4 to 2.0 cm$^3$/g and most preferably from 0.6 to 1.8 cm$^3$/g, determined by mercury porosimetry measurement.

According to a preferred embodiment of the present invention, the porous filler further comprises a surface-treatment layer on at least a part of the surface of the filler material, wherein the surface-treatment layer is formed by contacting the filler material with a surface-treatment composition in an amount from 0.07 to 9 mg/m$^2$ of the filler material surface, preferably 0.1 to 8 mg/m$^2$, more preferably 0.11 to 3 mg/m$^2$.

According to another preferred embodiment of the present invention, the surface-treatment composition comprises at least one unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof, preferably selected from the group consisting of
a) sodium, potassium, calcium, magnesium, lithium, strontium, primary amine, secondary amine, tertiary amine and/or ammonium salts, whereby the amine salts are linear or cyclic, of mono- or di-substituted succinic acids, whereby one or both acid groups can be in the salt form, preferably both acid groups are in the salt form; unsaturated fatty acids, preferably oleic acid and/or linoleic acid; unsaturated esters of phosphoric acid; abietic acid and/or mixtures thereof, preferred are completely neutralized surface treatment agents; and/or
b) a maleic anhydride grafted polybutadiene homopolymer or a maleic anhydride grafted polybutadiene-styrene copolymer and/or an acid and/or salt thereof, preferably a maleic anhydride grafted polybutadiene homopolymer having
i) a number average molecular weight $M_n$ measured by gel permeation chromatography from 1 000 to 20 000 g/mol, preferably from 1 400 to 15 000 g/mol, and more preferably from 2 000 to 10 000 g/mol measured according to EN ISO 16014-1:2019, and/or
ii) a number of anhydride groups per chain in the range from 2 to 12, preferably from 2 to 9, and more preferably from 2 to 6, and/or
iii) an anhydride equivalent weight in the range from 400 to 2 200, preferably from 500 to 2 000, and more preferably from 550 to 1 800, and/or
iv) an acid number in the range from 10 to 300 meq KOH per g of maleic anhydride grafted polybutadiene homopolymer, preferably 20 to 200 meq KOH/g, more preferably 30 to 150 meq KOH/g, measured according to ASTM D974-14, and/or
v) a molar amount of 1,2-vinyl groups in the range from 5 to 80 mol-%, preferably 10 to 60 mol-%, more preferably 15 to 40 mol-%, based on the total amount of unsaturated carbon moieties in the maleic anhydride grafted polybutadiene homopolymer,
and/or an acid and/or salt thereof.

According to yet another embodiment of the present invention, the surface-treatment composition comprises or further comprises at least one saturated surface-treatment agent selected from the group consisting of I) a phosphoric acid ester blend of one or more phosphoric acid mono-ester and/or salts thereof and/or one or more phosphoric acid di-ester and/or salts thereof, and/or
II) at least one saturated aliphatic linear or branched carboxylic acid and/or salts thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof and/or
III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or
IV) at least one polydialkylsiloxane, and/or
V) at least one trialkoxysilane, preferably a sulfur-containing trialkoxysilane or an amino-containing trialkoxysilane and/or
VI) mixtures of the materials according to I) to V).

According to a preferred embodiment of the present invention, the crosslinkable polymer is selected from natural or synthetic rubbers, such as ethylene-propylene rubber, ethylene-propylene-diene rubber, nitrile-butadiene rubber, acrylonitrile-butadiene rubber, butyl rubber, styrene-butadiene rubber, polyisoprene, hydrogenated nitrile-butadiene rubber, polychloroprene, isobutene-isoprene rubber, chloro-isobutene-isoprene rubber, brominated isobutylene-isoprene rubber, acrylic rubbers, butadiene rubbers, epichlorohydrin rubbers, silicone rubbers, fluorocarbon rubbers, polyurethane rubbers, polysulfide rubbers, thermoplastic rubbers, and mixtures thereof.

According to still another embodiment of the present invention, the porous filler is added to the crosslinkable polymer during mixing step d) in an amount in the range from 5 to 175 parts per hundred (phr), preferably from 10 to 160 parts per hundred, more preferably from 30 to 150 parts per hundred, based on the total weight of the crosslinkable polymer.

According to another preferred embodiment of the present invention, further additives, such as pigments, dyes, waxes, lubricants, oxidative- and/or UV-stabilizers, plasticizers, crosslinking agents, crosslinking coagents, compatibilizers, silanes, antioxidants, processing aids, further fillers and mixtures thereof, are added to the elastomer composition during mixing step d).

According to a further embodiment of the present invention, mixing step d) is performed in an internal mixer and/or external mixer, wherein the external mixer preferably is a cylinder mixer.

According to a preferred embodiment of the present invention, crosslinking step e) is performed by i) the addition of a crosslinking agent and a crosslinking coagent, and subsequent thermal crosslinking at a temperature of at least 100° C., preferably at least 150° C., more preferably at least 180° C., optionally in combination with compression molding at a pressure of at least 100 bar, preferably of at least 150 bar, more preferably of at least 200 bar, and/or ii) crosslinking by ultraviolet light radiation, electron-beam radiation, nuclear radiation, gamma radiation, microwave radiation and/or ultrasonic radiation.

According to another preferred embodiment of the present invention, the crosslinking agent is selected from the group consisting of peroxide crosslinking agents and/or sulfur-based crosslinking agents.

A third aspect of the invention relates to an elastomer composition having a reduced gas permeability formed from a composition comprising a crosslinkable polymer, a porous filler selected from the group consisting of surface-reacted calcium carbonate, precipitated hydromagnesite and mixtures thereof, and a further filler, preferably selected from the group consisting of carbon black, silica, ground natural calcium carbonate, precipitated calcium carbonate, talc, clay, kaolin, nanofillers, and mixtures thereof, wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source and mixtures thereof.

According to a preferred embodiment of the present invention, the volume ratio of the porous filler to the further filler is in the range from 10:90 to 90:10, preferably from 25:75 to 75:25, and more preferably from 40:60 to 60:40.

The inventors surprisingly found that the porous filler also imparts the advantageous properties to an elastomer composition, if a conventional filler is partly replaced by the inventive porous filler. Thereby, the potentially beneficial influence of conventional fillers may be attained, while their respective amounts are reduced.

According to a preferred embodiment of the present invention, the filler material has a BET specific surface area from 20 to 200 m²/g, preferably 40 to 150 m²/g, more preferably 70 to 120 m²/g; and/or a volume median particle size $d_{50}$ from 0.1 to 75 μm, preferably from 0.5 to 50 μm, more preferably from 1 to 40 μm, even more preferably from 1.2 to 30 μm, and most preferably from 1.5 to 15 μm; and/or a volume top cut particle size $d_{98}$ from 0.2 to 150 μm, preferably from 1 to 100 μm, more preferably from 2 to 80 μm, even more preferably from 2.4 to 60 μm, and most preferably from 3 to 30 μm; and/or an intra-particle intruded specific pore volume in the range from 0.1 to 3.0 cm³/g, more preferably from 0.2 to 2.5 cm³/g, still more preferably from 0.4 to 2.0 cm³/g and most preferably from 0.6 to 1.8 cm³/g, determined by mercury porosimetry measurement.

According to another preferred embodiment of the present invention, the porous filler further comprises a surface-treatment layer on at least a part of the surface of the filler material, wherein the surface-treatment layer is formed by contacting the filler material with a surface-treatment composition in an amount from 0.07 to 9 mg/m² of the filler material surface, preferably 0.1 to 8 mg/m², more preferably 0.11 to 3 mg/m², and wherein the surface-treatment composition preferably comprises a surface-treatment agent preferably selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof, more preferably selected from the group consisting of
- a) sodium, potassium, calcium, magnesium, lithium, strontium, primary amine, secondary amine, tertiary amine and/or ammonium salts, whereby the amine salts are linear or cyclic, of mono- or di-substituted succinic acids, whereby one or both acid groups can be in the salt form, preferably both acid groups are in the salt form; unsaturated fatty acids, preferably oleic acid and/or linoleic acid; unsaturated esters of phosphoric acid; abietic acid and/or mixtures thereof, preferred are completely neutralized surface treatment agents; and/or
- b) a maleic anhydride grafted polybutadiene homopolymer or a maleic anhydride grafted polybutadiene-styrene copolymer and/or an acid and/or salt thereof, preferably a maleic anhydride grafted polybutadiene homopolymer having
  - i) a number average molecular weight $M_n$ measured by gel permeation chromatography from 1 000 to 20 000 g/mol, preferably from 1 400 to 15 000 g/mol, and more preferably from 2 000 to 10 000 g/mol measured according to EN ISO 16014-1:2019, and/or
  - ii) a number of anhydride groups per chain in the range from 2 to 12, preferably from 2 to 9, and more preferably from 2 to 6, and/or
  - iii) an anhydride equivalent weight in the range from 400 to 2 200, preferably from 500 to 2 000, and more preferably from 550 to 1 800, and/or
  - iv) an acid number in the range from 10 to 300 meq KOH per g of maleic anhydride grafted polybutadiene homopolymer, preferably 20 to 200 meq KOH/g, more preferably 30 to 150 meq KOH/g, measured according to ASTM D974-14, and/or
  - v) a molar amount of 1,2-vinyl groups in the range from 5 to 80 mol-%, preferably 10 to 60 mol-%, more preferably 15 to 40 mol-%, based on the total amount of unsaturated carbon moieties in the maleic anhydride grafted polybutadiene homopolymer, and/or an acid and/or salt thereof.

According to yet another embodiment of the present invention, the surface-treatment composition comprises or further comprises at least one saturated surface-treatment agent selected from the group consisting of
- I) a phosphoric acid ester blend of one or more phosphoric acid mono-ester and/or salts thereof and/or one or more phosphoric acid di-ester and/or salts thereof, and/or
- II) at least one saturated aliphatic linear or branched carboxylic acid and/or salts thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof and/or
- III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or
- IV) at least one polydialkylsiloxane, and/or
- V) at least one trialkoxysilane, preferably a sulfur-containing trialkoxysilane or an amino-containing trialkoxysilane and/or
- VI) mixtures of the materials according to I) to V).

The inventors surprisingly found that the beneficial properties of a surface-treatment layer can also be obtained with saturated surface-treatment agents, and/or combinations of saturated and unsaturated surface-treatment agents.

According to a preferred embodiment of the present invention, the elastomer composition comprises an elastomer formed from a crosslinkable polymer selected from natural or synthetic rubbers, such as ethylene-propylene rubber, ethylene-propylene-diene rubber, nitrile-butadiene rubber, acrylonitrile-butadiene rubber, butyl rubber, styrene-butadiene rubber, polyisoprene, hydrogenated nitrile-butadiene rubber, polychloroprene, isobutene-isoprene rubber, chloro-isobutene-isoprene rubber, brominated isobutylene-isoprene rubber, acrylic rubbers, butadiene rubbers, epichlorhydrin rubbers, silicone rubbers, fluorocarbon rubbers, polyurethane rubbers, polysulfide rubbers, thermoplastic rubbers, and mixtures thereof.

According to still another embodiment of the present invention, the porous filler is contained in the elastomer composition in an amount in the range from 5 to 175 parts per hundred (phr), preferably from 10 to 160 parts per hundred, more preferably from 30 to 150 parts per hundred, based on the total weight of the crosslinkable polymer in the elastomer composition.

According to another preferred embodiment of the present invention, the elastomer composition further comprises additives, such as pigments, dyes, waxes, lubricants, oxidative- and/or UV-stabilizers, plasticizers, crosslinking agents, crosslinking coagents, compatibilizers, silanes antioxidants, processing aids and mixtures thereof.

According to still another preferred embodiment of the present invention, the Shore A hardness of the elastomer composition is increased, preferably by at least 3%, more preferably by at least 8%, compared to the same elastomer composition, wherein the porous filler is replaced by carbon black in an isovolumic amount, and/or the air permeability is decreased, preferably by at least 5%, more preferably at least 10%, and most preferably at least 15%, compared to the same elastomer composition, wherein the porous filler is replaced by carbon black in an isovolumic amount, wherein the carbon black has a statistical thickness surface area (STSA) of 39±5 m$^2$/g, measured according to ASTM D 6556-19, and wherein the Shore A hardness is measured according to NF ISO 7619-1:2010 and the air permeability is measured according to NF ISO 2782-1:2018.

A fourth aspect of the present invention relates to an article formed from the inventive elastomer composition, wherein the article is preferably selected from the group comprising tubeless articles, membranes, sealings, O-rings, gloves, pipes, cables, electrical connectors, oil hoses and shoe soles.

It should be understood that for the purposes of the present invention, the following terms have the following meanings.

According to the definition by the IUPAC, which is adhered to throughout the present document, an "elastomer" is a polymer that shows rubber-like elasticity, and comprises crosslinks, preferably permanent crosslinks. It should be understood that the term "elastomer" encompasses all kinds of synthetic rubbers and natural rubbers.

For the purposes of the present invention, an "elastomer precursor" is a polymer, which comprises crosslinkable sites, e.g., carbon multiple bonds, halogen functional groups, or hydrocarbon moieties, and which upon crosslinking forms an elastomer in the meaning of the present invention. The term is used synonymously with the wording "crosslinkable polymer".

A "surface-reacted calcium carbonate" according to the present invention is a reaction product of ground natural calcium carbonate (GNCC) or precipitated calcium carbonate (PCC) treated with carbon dioxide and one or more $H_3O^+$ ion donors, wherein the carbon dioxide is formed in situ by the $H_3O^+$ ion donors treatment and/or is supplied from an external source. An $H_3O^+$ ion donor in the context of the present invention is a Brønsted acid and/or an acid salt.

The "particle size" of surface-reacted calcium carbonate herein, if not explicitly stated otherwise, is described as volume-based particle size distribution $d_x(vol)$, or $d_x$. Therein, the value $d_x(vol)$ represents the diameter relative to which x % by volume of the particles have diameters less than $d_x(vol)$. This means that, for example, the $d_{20}$ (vol) value is the particle size at which 20 vol. % of all particles are smaller than that particle size. The $d_{50}$ (vol) value is thus the volume median particle size, also referred to as average particle size, i.e. 50 vol. % of all particles are smaller than that particle size and the $d_{98}$ (vol) value, referred to as volume-based top cut particle size, is the particle size at which 98 vol. % of all particles are smaller than that particle size. If a particle size is given herein as weight-based particle size, then, e.g., the $d_{20}$ (wt) value is the particle size at which 20 wt.-% of all particles are smaller than that particle size. The $d_{50}$ (wt) value is thus the volume median particle size, also referred to as weight median particle size, i.e. 50 wt.-% of all particles are smaller than that particle size and the $d_{98}$ (wt) value, referred to as weight-based top cut particle size, is the particle size at which 98 wt.-% of all particles are smaller than that particle size.

For the purpose of the present invention the "porosity" or "pore volume" refers to the intra-particle intruded specific pore volume.

In the context of the present invention, the term "pore" is to be understood as describing the space that is found between and/or within particles, i.e. that is formed by the particles as they pack together under nearest neighbour contact (interparticle pores), such as in a powder or a compact, and/or the void space within porous particles (intraparticle pores), and that allows the passage of liquids under pressure when saturated by the liquid and/or supports absorption of surface wetting liquids.

Throughout the present document, the term "specific surface area" (in $m^2/g$), which is used to define surface-reacted calcium carbonate or other materials, refers to the specific surface area as determined by using the BET method (using nitrogen as adsorbing gas), according to ISO 9277: 2010.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that, e.g., an embodiment must be obtained by, e.g., the sequence of steps following the term "obtained" even though such a limited understanding is always included by the terms "obtained" or "defined" as a preferred embodiment.

When in the following reference is made to preferred embodiments or technical details of the inventive use of the porous filler for reducing the gas permeability of a crosslinked elastomer composition, it is to be understood that these preferred embodiments or technical details also refer to the inventive process, the inventive composition and the inventive article (as far as applicable).

The Porous Filler

The inventive use, the inventive process, the inventive composition and the inventive article make use of a porous filler. For the purposes of the present invention, the term "porous" filler refers to a filler material having a BET surface area of at least 20 $m^2/g$, for example at least 40 $m^2/g$, or at least 70 $m^2/g$, as measured according to ISO 9277: 2010, and an intra-particle intruded specific pore volume of at least 0.1 $cm^3/g$.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 µm nm). The equilibration time used at each pressure step is 20 seconds. The sample material is sealed in a 3 $cm^3$ penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764).

The total pore volume seen in the cumulative intrusion data can be separated into two regions with the intrusion data from 214 µm down to about 1-4 µm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

The porous filler of the invention comprises a filler material selected from the group consisting of surface-reacted calcium carbonate, precipitated hydromagnesite, and mixtures thereof.

The Surface-Reacted Calcium Carbonate

According to one preferred embodiment of the present invention, the filler material is a surface-reacted calcium carbonate. The surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

A $H_3O^+$ ion donor in the context of the present invention is a Brønsted acid and/or an acid salt.

In a preferred embodiment of the invention, the surface-reacted calcium carbonate is obtained by a process comprising the steps of: (a) providing a suspension of natural or precipitated calcium carbonate, (b) adding at least one acid having a $pK_a$ value of 0 or less at 20° C. or having a $pK_a$ value from 0 to 2.5 at 20° C. to the suspension of step (a), and (c) treating the suspension of step (a) with carbon dioxide before, during or after step (b). According to another embodiment, the surface-reacted calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

"Natural ground calcium carbonate" (GCC) preferably is selected from calcium carbonate containing minerals selected from the group comprising marble, chalk, limestone and mixtures thereof. Natural calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, obtained by precipitation following the reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural calcium carbonate as described above.

According to one embodiment of the present invention, the natural or precipitated calcium carbonate is in form of particles having a weight median particle size $d_{50}$ of 0.05 to 10.0 µm, preferably 0.2 to 5.0 µm, more preferably 0.4 to 3.0 µm, most preferably 0.6 to 1.2 µm, especially 0.7 µm. According to a further embodiment of the present invention, the natural or precipitated calcium carbonate is in form of particles having a weight-based top cut particle size $d_{98}$ of 0.15 to 55 µm, preferably 1 to 40 µm, more preferably 2 to 25 µm, most preferably 3 to 15 µm, especially 4 µm.

The natural and/or precipitated calcium carbonate may be used dry or suspended in water. Preferably, a corresponding slurry has a content of natural or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2+}$ or $Ca^{2+}$. The at least one $H_3O^+$ ion donor can also be a mixture of one or more acids and one or more acidic salts.

According to still another embodiment, the at least one $H_3O^+$ ion donor is a weak acid having a $pK_a$ value of greater than 2.5 and less than or equal to 7, when measured at 20°

C., associated with the ionisation of the first available hydrogen, and having a corresponding anion, which is capable of forming water-soluble calcium salts. Subsequently, at least one water-soluble salt, which in the case of a hydrogen-containing salt has a p$K_a$ of greater than 7, when measured at 20° C., associated with the ionisation of the first available hydrogen, and the salt anion of which is capable of forming water-insoluble calcium salts, is additionally provided. According to the preferred embodiment, the weak acid has a p$K_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a corresponding cation such as $Li^+$, $Na^+$ or $K^-$, $HPO_4^{2-}$, being at least partially neutralised by a corresponding cation such as $Li^+$, $Na^+$, $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a next step, the natural or precipitated calcium carbonate is treated with carbon dioxide. If a strong acid such as sulphuric acid or hydrochloric acid is used for the $H_3O^+$ ion donor treatment of the natural or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a p$K_a$ in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural or precipitated calcium carbonate, the natural or precipitated calcium carbonate is reacted with the one or more $H_3O^+$ ion donors and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the one or more $H_3O^+$ ion donors and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with the one or more $H_3O^+$ ion donors and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses and salts thereof.

Alternatively, the aqueous suspension described above can be dried, thereby obtaining the solid (i.e. dry or containing as little water that it is not in a fluid form) surface-reacted natural or precipitated calcium carbonate in the form of granules or a powder.

It is appreciated that the surface-reacted calcium carbonate can be one or a mixture of different kinds of surface-reacted calcium carbonate(s). In one embodiment of the present invention, the surface-reacted calcium carbonate comprises, preferably consists of, one kind of surface-reacted calcium carbonate. Alternatively, the surface-reacted calcium carbonate comprises, preferably consists of, two or more kinds of surface-reacted calcium carbonates. For example, the surface-reacted calcium carbonate comprises, preferably consists of, two or three kinds of surface-reacted calcium carbonates. Preferably, the surface-reacted calcium carbonate comprises, more preferably consists of, one kind of surface-reacted calcium carbonate.

The Precipitated Hydromagnesite

In another embodiment of the different aspects of the present invention, the filler material is precipitated hydromagnesite. Hydromagnesite or basic magnesium carbonate, which is the standard industrial name for hydromagnesite, is a naturally occurring mineral which is found in magnesium rich minerals such as serpentine and altered magnesium rich igneous rocks, but also as an alteration product of brucite in periclase marbles. Hydromagnesite is described as having the following formula $Mg_5(CO_3)_4(OH)_2 \cdot 4H_2O$.

It should be appreciated that hydromagnesite is a very specific mineral form of magnesium carbonate and occurs naturally as small needle-like crystals or crusts of acicular or bladed crystals. In addition thereto, it should be noted that hydromagnesite is a distinct and unique form of magnesium carbonate and is chemically, physically and structurally different from other forms of magnesium carbonate. Hydromagnesite can readily be distinguished from other magnesium carbonates by x-ray diffraction analysis, thermogravimetric analysis or elemental analysis. Unless specifically described as hydromagnesite, all other forms of magnesium carbonates (e.g. artinite ($Mg_2(CO_3)(OH)_2 \cdot 3H_2O$), dypingite ($Mg_5(CO_3)_4(OH)_2 \cdot 5H_2O$), giorgiosite ($Mg_5(CO_3)_4(OH)_2 \cdot 5H_2O$), pokrovskite ($Mg_2(CO_3)(OH)_2 \cdot 0.5H_2O$), magnesite ($MgCO_3$), barringtonite ($MgCO_3 \cdot 2H_2O$), lansfordite ($MgCO_3 \cdot 5H_2O$) and nesquehonite ($MgCO_3 \cdot 3H_2O$)) are not hydromagnesite within the meaning of the present invention and do not correspond chemically to the formula described above.

Besides the natural hydromagnesite, precipitated hydromagnesites (or synthetic magnesium carbonates) can be prepared. For instance, U.S. Pat. Nos. 1,361,324, 935,418, GB 548,197 and GB 544,907 generally describe the formation of aqueous solutions of magnesium bicarbonate (typically described as "$Mg(HCO_3)_2$"), which is then transformed by the action of a base, e.g., magnesium hydroxide, to form hydromagnesite. Other processes described in the art suggest to prepare compositions containing both, hydromagnesite and magnesium hydroxide, wherein magnesium hydroxide is mixed with water to form a suspension which is further contacted with carbon dioxide and an aqueous basic solution to form the corresponding mixture; cf. for example U.S. Pat. No. 5,979,461. WO 2011/054831 A1 relates to a process for preparing precipitated hydromagnesite in an aqueous environment.

The instant embodiment of the present invention relates to precipitated hydromagnesite. It is appreciated that the precipitated hydromagnesite can be one or a mixture of different kinds of precipitated hydromagnesite(s). In one embodiment of the present invention, the precipitated hydromagnesite comprises, preferably consists of, one kind of precipitated hydromagnesite. Alternatively, the precipitated hydromagnesite comprises, preferably consists of, two or more kinds of precipitated hydromagnesites. For example, the precipitated hydromagnesite comprises, preferably consists of, two or three kinds of precipitated hydromagnesites. Preferably, the precipitated hydromagnesite comprises, more preferably consists of, one kind of precipitated hydromagnesite.

In a further embodiment, the porous filler of the present invention comprises a filler material consisting of mixtures of the above-described surface-reacted calcium carbonate and the above-described precipitated hydromagnesite. Preferably, the filler material consists of surface-reacted calcium carbonate. It is preferred that the porous filler consists of the filler material and the surface-treatment layer, or the porous filler consists of the filler material.

In a preferred embodiment, the filler material has a BET specific surface area of 20 to 200 $m^2/g$, preferably 40 to 150 $m^2/g$ and more preferably 70 to 120 $m^2/g$, measured using the BET method. The BET specific surface area in the meaning of the present invention is defined as the surface area of the particles divided by the mass of the particles. As used herein, the specific surface area is measured by adsorption using the BET isotherm (ISO 9277:2010) using nitrogen gas and is specified in $m^2/g$.

It is furthermore preferred that the filler material has a volume median particle size $d_{50}$ (vol) of 0.1 to 75 μm, preferably from 0.5 to 50 μm, more preferably from 1 to 40 μm, even more preferably from 1.2 to 30 μm, and most preferably from 1.5 to 15 μm.

It may furthermore be preferred that the filler material has a volume top cut particle size $d_{98}$ (vol) of from 0.2 to 150 μm, preferably from 1 to 100 μm, more preferably from 2 to 80 μm, even more preferably from 2.4 to 60 μm, and most preferably from 3 to 30 μm.

Preferably, the filler material has an intra-particle intruded specific pore volume in the range from 0.1 to 3.0 $cm^3/g$, more preferably from 0.2 to 2.5 $cm^3/g$, still more preferably from 0.4 to 2.0 $cm^3/g$ and most preferably from 0.6 to 1.8 $cm^3/g$, determined by mercury porosimetry measurement.

In an exemplary embodiment, the filler material has a BET specific surface area of 20 to 200 $m^2/g$, preferably 40 to 150 $m^2/g$ and more preferably 70 to 120 $m^2/g$, and a volume median particle size $d_{50}$ (vol) of 0.1 to 75 µm, preferably from 0.5 to 50 µm, more preferably from 1 to 40 µm, even more preferably from 1.2 to 30 µm, and most preferably from 1.5 to 15 µm. For example, the filler material may consist of surface-reacted calcium carbonate having a BET specific surface area of 20 to 200 m²/g, preferably 40 to 150 m²/g and more preferably 70 to 120 m²/g, and a volume median particle size $d_{50}$ (vol) of 0.1 to 75 µm, preferably from 0.5 to 50 µm, more preferably from 1 to 40 µm, even more preferably from 1.2 to 30 µm, and most preferably from 1.5 to 15 µm.

The Surface-Treatment Layer

According to a preferred embodiment, the porous filler further comprises a surface-treatment layer on at least a part of the surface of the filler material, wherein the surface-treatment layer is formed by contacting the filler material with a surface-treatment composition in an amount from 0.07 to 9 mg/m² of the filler material surface, preferably 0.1 to 8 mg/m², more preferably 0.11 to 3 mg/m². The surface-treatment composition comprises one or more surface-treatment agents.

A "surface-treatment agent" in the meaning of the present invention is any material, which is capable of reacting and/or forming an adduct with the surface of the filler material, thereby forming a surface-treatment layer on at least a part of the surface of the filler material, which preferably renders the filler surface more hydrophobic. It should be understood that the present invention is not limited to any particular surface-treatment agents. The skilled person knows how to select suitable materials for use as surface-treatment agents. However, it is preferred that the surface-treatment agents are selected from unsaturated and/or saturated surface-treatment agents.

In a preferred embodiment, the surface-treatment composition comprises an unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof. Preferably, the unsaturated surface-treatment agent is selected from the group consisting of a) sodium, potassium, calcium, magnesium, lithium, strontium, primary amine, secondary amine, tertiary amine and/or ammonium salts, whereby the amine salts are linear or cyclic, of mono- or di-substituted succinic acids, whereby one or both acid groups can be in the salt form, preferably both acid groups are in the salt form; unsaturated fatty acids, preferably oleic acid and/or linoleic acid; unsaturated esters of phosphoric acid; abietic acid and/or mixtures thereof, preferred are completely neutralized surface treatment agents; and/or b) a maleic anhydride grafted polybutadiene homopolymer or a maleic anhydride grafted polybutadiene-styrene copolymer and/or an acid and/or salt thereof, preferably a maleic anhydride grafted polybutadiene homopolymer having i) a number average molecular weight $M_n$ measured by gel permeation chromatography from 1 000 to 20 000 g/mol, preferably from 1 400 to 15 000 g/mol, and more preferably from 2 000 to 10 000 g/mol measured according to EN ISO 16014-1:2019, and/or ii) a number of anhydride groups per chain in the range from 2 to 12, preferably from 2 to 9, and more preferably from 2 to 6, and/or iii) an anhydride equivalent weight in the range from 400 to 2 200, preferably from 500 to 2 000, and more preferably from 550 to 1 800, and/or iv) an acid number in the range from 10 to 300 meq KOH per g of maleic anhydride grafted polybutadiene homopolymer, preferably 20 to 200 meq KOH/g, more preferably 30 to 150 meq KOH/g, measured according to ASTM D974-14, and/or v) a molar amount of 1,2-vinyl groups in the range from 5 to 80 mol-%, preferably 10 to 60 mol-%, more preferably 15 to 40 mol-%, based on the total amount of unsaturated carbon moieties in the maleic anhydride grafted polybutadiene homopolymer, and/or an acid and/or salt thereof.

The wording "comprising unsaturated carbon moieties" should be understood in that the respective compound comprises at least one unsaturated carbon moiety, such as a carbon-carbon double bond. For example, the respective compound may comprise one unsaturated carbon moiety. However, the respective compound may also comprise more than one unsaturated carbon moiety.

For the purposes of the present invention, an "unsaturated carbon moiety" refers to a double or triple bond, for example a carbon-carbon double bond, a carbon-carbon triple bond or a carbon-heteroatom multiple bond. Preferably, the unsaturated carbon moiety is a carbon-carbon double bond. It is appreciated that the unsaturated carbon moiety should be chemically crosslinkable, i.e., does not form part of an aromatic system.

In another embodiment, the surface-treatment composition comprises a saturated surface-treatment agent selected from the group consisting of I) a phosphoric acid ester blend of one or more phosphoric acid mono ester and/or salts thereof and/or one or more phosphoric acid di-ester and/or salts thereof, and/or II) at least one saturated aliphatic linear or branched carboxylic acid and/or salts thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof and/or III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or IV) at least one polydialkylsiloxane, and/or V) at least one trialkoxysilane, preferably a sulfur-containing trialkoxysilane or an amino-containing trialkoxysilane and/or VI) mixtures of the materials according to I) to V).

In still another preferred embodiment, the surface-treatment composition comprises an unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof, and further comprises a saturated surface-treatment agent selected from the group consisting of I) a phosphoric acid ester blend of one or more phosphoric acid mono ester and/or salts thereof and/or one or more phosphoric acid di-ester and/or salts thereof, and/or II) at least one saturated aliphatic linear or branched carboxylic acid and/or salts thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof and/or III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or IV) at least one polydialkylsiloxane, and/or V) at least one trialkoxysilane, preferably a sulfur-containing trialkoxysilane or an amino-containing trialkoxysilane and/or VI) mixtures of the materials according to I) to V).

In the following, the saturated and unsaturated surface-treatment agents will be described more in detail.

According to one embodiment, the unsaturated surface-treatment agent can be a mono- or di-substituted succinic anhydride containing compound comprising unsaturated carbon moieties, a mono- or di-substituted succinic acid containing compound comprising unsaturated carbon moieties, or a mono- or di-substituted succinic acid salt containing compound comprising unsaturated carbon moieties. Preferred are mono-substituted succinic anhydride containing compounds comprising unsaturated carbon moieties, mono-substituted succinic acid containing compounds comprising unsaturated carbon moieties, or mono-substituted succinic acid salt containing compounds comprising unsaturated carbon moieties.

The term "succinic anhydride containing compound" refers to a compound containing succinic anhydride. The term "succinic anhydride", also called dihydro-2,5-furandione, succinic acid anhydride or succinyl oxide, has the molecular formula $C_4H_4O_3$ and is the acid anhydride of succinic acid.

The term "mono-substituted" succinic anhydride containing compound in the meaning of the present invention refers to a succinic anhydride wherein a hydrogen atom is substituted by another substituent.

The term "di-substituted" succinic anhydride containing compound in the meaning of the present invention refers to a succinic anhydride wherein two hydrogen atoms are substituted by another substituent.

The term "succinic acid containing compound" refers to a compound containing succinic acid. The term "succinic acid" has the molecular formula $C_4H_6O_4$.

The term "mono-substituted" succinic acid in the meaning of the present invention refers to a succinic acid wherein a hydrogen atom is substituted by another substituent.

The term "di-substituted" succinic acid containing compound in the meaning of the present invention refers to a succinic acid wherein two hydrogen atoms are substituted by another substituent.

The term "succinic acid salt containing compound" refers to a compound containing succinic acid, wherein the active acid groups are partially or completely neutralized. The term "partially neutralized" succinic acid salt containing compound refers to a degree of neutralization of the active acid groups in the range from 40 and 95 mole-%, preferably from 50 to 95 mole-%, more preferably from 60 to 95% and most preferably from 70 to 95%. The term "completely neutralized" succinic acid salt containing compound refers to a degree of neutralization of the active acid groups of >95 mole-%, preferably of >99 mole-%, more preferably of >99.8 mole-% and most preferably of 100 mole-%. Preferably, the active acid groups are partially or completely neutralized.

The succinic acid salt containing compound comprising unsaturated carbon moieties is preferably a compound selected from the group consisting of sodium, potassium, calcium, magnesium, lithium, strontium, primary amine, secondary amine, tertiary amine and/or ammonium salts thereof, whereby the amine salts are linear or cyclic. It is appreciated that one or both acid groups can be in the salt form, preferably both acid groups are in the salt form.

The term "mono-substituted" succinic acid salt in the meaning of the present invention refers to a succinic acid salt wherein a hydrogen atom is substituted by another substituent.

The term "di-substituted" succinic acid containing compound in the meaning of the present invention refers to a succinic acid salt wherein two hydrogen atoms are substituted by another substituent.

Accordingly, the mono- or di-substituted succinic anhydride containing compounds comprising unsaturated carbon moieties, mono- or di-substituted succinic acid containing compounds comprising unsaturated carbon moieties or mono- or di-substituted succinic acid salts containing compounds comprising unsaturated carbon moieties comprise substituent(s) $R^1$ and/or $R^2$ comprising unsaturated carbon moieties. The unsaturated carbon moieties are located terminally and/or in a side chain of substituent(s) $R^1$ and/or $R^2$.

The substituent(s) $R^1$ and/or $R^2$ comprising a carbon-carbon double bond is/are preferably selected from an isobutylene, a polyisobutylene, a polybutadiene, a polybutadiene-styrene copolymer, an acryloyl, a methacryloyl group or mixtures thereof. For example, the surface-treatment agent may be a maleic anhydride grafted polybutadiene homopolymer or a maleic anhydride grafted polybutadiene-styrene copolymer and/or an acid and/or salt thereof, preferably a maleic anhydride grafted polybutadiene homopolymer and/or an acid and/or salt thereof.

The maleic anhydride grafted polybutadiene homopolymer preferably has
i) a number average molecular weight $M_n$ measured by gel permeation chromatography from 1 000 to 20 000 g/mol, preferably from 1 400 to 15 000 g/mol, and more preferably from 2 000 to 10 000 g/mol, measured according to EN ISO 16014-1:2019, and/or
ii) a number of anhydride groups per chain in the range from 2 to 12, preferably from 2 to 9, and more preferably from 2 to 6, and/or
iii) an anhydride equivalent weight in the range from 400 to 2 200, preferably from 500 to 2 000, and more preferably from 550 to 1 800, and/or iv) an acid number in the range from 10 to 300 meq KOH per g of maleic anhydride grafted polybutadiene homopolymer, preferably 20 to 200 meq KOH/g, more preferably 30 to 150 meq KOH/g, measured according to ASTM D974-14, and/or v) a molar amount of 1,2-vinyl groups in the range from 5 to 80 mol-%, preferably 10 to 60 mol-%, more preferably 15 to 40 mol-%, based on the total amount of unsaturated carbon moieties in the maleic anhydride grafted polybutadiene homopolymer.

The term "maleic anhydride grafted" means that a succinic anhydride is obtained after reaction of substituent(s) $R^1$ and/or $R^2$ comprising a carbon-carbon double bond with the double bond of maleic anhydride. Thus, the terms "maleic anhydride grafted polybutadiene homopolymer" and "maleic anhydride grafted polybutadiene-styrene copolymer" refer to a polybutadiene homopolymer and a polybutadiene-styrene copolymer each bearing succinic anhydride moieties formed from the reaction of a carbon-carbon double bond with the double bond of maleic anhydride, respectively.

The term "anhydride equivalent weight" refers to the number average molecular weight $M_n$ measured by gel permeation chromatography divided by the number of anhydride groups per chain.

For example, the maleic anhydride grafted polybutadiene homopolymer may have a number average molecular weight $M_n$ measured by gel permeation chromatography from 1 000 to 20 000 g/mol, preferably from 1 400 to 15 000 g/mol, more preferably from 2 000 to 10 000 g/mol, an acid number in the range from 20 to 200 meq KOH per g of maleic anhydride grafted polybutadiene homopolymer, preferably 30 to 150 meq KOH/g, measured according to ASTM D974-14, and a molar amount of 1,2-vinyl groups in the range from 10 to 60 mol-%, preferably 15 to 40 mol-%. In another embodiment, the maleic anhydride grafted polybutadiene homopolymer may have a number average molecular weight $M_n$ measured by gel permeation chromatography from 2000 to 5000 g/mol, an acid number in the range from 30 to 100 meq KOH/g, measured according to ASTM D974-14, and a molar amount of 1,2-vinyl groups in the range from 15 to 40 mol-%.

In one embodiment of the present invention, the salt of the maleic anhydride grafted polybutadiene homopolymer or the maleic anhydride grafted polybutadiene-styrene copolymer may be selected from the group comprising sodium salt, potassium salt, calcium salt, magnesium salt, lithium salt, strontium salt, primary amine salt, secondary amine salt, tertiary amine salt and/or ammonium salts thereof, and preferably is selected from the group consisting of sodium salt, potassium salt, calcium salt and/or magnesium salt thereof.

In a preferred embodiment of the present invention, the surface-treatment agent is a salt of a maleic anhydride grafted polybutadiene homopolymer selected from the group consisting of sodium, potassium, calcium, magnesium, lithium, strontium, primary amine, secondary amine, tertiary amine and/or ammonium salts thereof, preferably selected from the group consisting of sodium, potassium, calcium and/or magnesium salts thereof. More preferably, the salt of the maleic anhydride grafted polybutadiene homopolymer has a number average molecular weight $M_n$ measured by gel permeation chromatography from 1 000 to 20 000 g/mol, preferably from 1 400 to 15 000 g/mol, more preferably from 2 000 to 10 000 g/mol, an acid number in the range from 20 to 200 meq KOH per g of maleic anhydride grafted polybutadiene homopolymer, preferably 30 to 150 meq KOH/g, measured according to ASTM D974-14, and a molar amount of 1,2-vinyl groups in the range from 10 to 60 mol-%, preferably 15 to 40 mol-%.

The salt of the maleic anhydride grafted polybutadiene homopolymer or the maleic anhydride grafted polybutadiene-styrene copolymer may be obtained by hydrolysis and partial or full neutralization from the corresponding anhydride, e.g., by treatment of the maleic anhydride grafted polybutadiene homopolymer or a maleic anhydride grafted polybutadiene-styrene copolymer and/or acid thereof with a base, preferably sodium hydroxide or an aqueous solution of sodium hydroxide.

Thus, it is to be understood that the acid or salt of the maleic anhydride grafted polybutadiene homopolymer is preferably derivable by hydrolysis from a maleic anhydride grafted polybutadiene homopolymer having i) a number average molecular weight $M_n$ measured by gel permeation chromatography from 1 000 to 20 000 g/mol, preferably from 1 400 to 15 000 g/mol, and more preferably from 2 000 to 10 000 g/mol, measured according to EN ISO 16014-1:2019, and/or ii) a number of anhydride groups per chain in the range from 2 to 12, preferably from 2 to 9, and more preferably from 2 to 6, and/or iii) an anhydride equivalent weight in the range from 400 to 2 200, preferably from 500 to 2 000, and more preferably from 550 to 1 800, and/or iv) an acid number in the range from 10 to 300 meq KOH per g of maleic anhydride grafted polybutadiene homopolymer, preferably 20 to 200 meq KOH/g, more preferably 30 to 150 meq KOH/g, measured according to ASTM D974-14, and/or v) a molar amount of 1,2-vinyl groups in the range from 5 to 80 mol-%, preferably 10 to 60 mol-%, more preferably 15 to 40 mol-%, based on the total amount of unsaturated carbon moieties in the maleic anhydride grafted polybutadiene homopolymer.

The surface-treatment composition may comprise, preferably consist of a maleic anhydride grafted polybutadiene homopolymer or a maleic anhydride grafted polybutadiene-styrene copolymer and/or an acid and/or salt thereof, preferably a maleic anhydride grafted polybutadiene homopolymer and/or an acid and/or salt thereof. Thus, the surface-treatment layer of the porous filler may be formed by contacting the filler material with said surface-treatment composition in an amount from 0.07 to 9 mg/m$^2$ of the filler material surface, preferably 0.1 to 8 mg/m$^2$, more preferably 0.11 to 3 mg/m$^2$.

For example, the surface-treatment layer on at least a part of the surface of the filler material may be formed by contacting the filler material with the maleic anhydride grafted polybutadiene homopolymer, or the maleic anhydride grafted polybutadiene homopolymer and/or an acid and/or salt thereof having a number average molecular weight $M_n$ measured by gel permeation chromatography from 1 000 to 20 000 g/mol, preferably from 1 400 to 15 000 g/mol, more preferably from 2 000 to 10 000 g/mol, an acid number in the range from 20 to 200 meq KOH per g of maleic anhydride grafted polybutadiene homopolymer, preferably 30 to 150 meq KOH/g, measured according to ASTM D974-14, and/or a molar amount of 1,2-vinyl groups in the range from 10 to 60 mol-%, preferably 15 to 40 mol-%, in an amount from 0.07 to 9 mg/m$^2$ of the filler material surface, preferably 0.1 to 8 mg/m$^2$, more preferably 0.11 to 3 mg/m$^2$.

In another embodiment of the present invention, the mono-substituted succinic anhydride compound comprising unsaturated carbon moieties is at least one linear or branched alkenyl mono-substituted succinic anhydride compound comprising unsaturated carbon moieties. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the mono-substituted succinic anhydride compound comprising unsaturated carbon moieties is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

In one embodiment of the present invention, the mono-substituted succinic anhydride compound comprising unsaturated carbon moieties is a mixture of two or more kinds of alkenyl mono-substituted succinic anhydrides. For example, the mono-substituted succinic anhydride compound comprising unsaturated carbon moieties is a mixture of two or three kinds of alkenyl mono-substituted succinic anhydrides.

If the mono-substituted succinic anhydride compound comprising unsaturated carbon moieties is a mixture of two or more kinds of alkenyl mono-substituted succinic anhydrides, one alkenyl mono-substituted succinic anhydride is linear or branched octadecenyl succinic anhydride, while each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. For example, the mono-substituted succinic anhydride compound comprising unsaturated carbon moieties is a mixture of two or more kinds of alkenyl mono-substituted succinic anhydrides, wherein one alkenyl mono-substituted succinic anhydride is linear octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. Alternatively, the mono-substituted succinic anhydride compound comprising unsaturated carbon moieties is a mixture of two or more kinds of alkenyl mono-substituted succinic anhydrides, wherein one alkenyl mono-substituted succinic anhydride is branched octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof.

For example, the mono-substituted succinic anhydride compound comprising unsaturated carbon moieties is a mixture of two or more kinds of alkenyl mono-substituted succinic anhydrides comprising one or more hexadecenyl succinic anhydride, like linear or branched hexadecenyl succinic anhydride(s), and one or more octadecenyl succinic anhydride, like linear or branched octadecenyl succinic anhydride(s).

In one embodiment of the present invention, the mono-substituted succinic anhydride compound comprising unsaturated carbon moieties is a mixture of two or more kinds of alkenyl mono-substituted succinic anhydrides comprising linear hexadecenyl succinic anhydride(s) and linear octadecenyl succinic anhydride(s). Alternatively, the mono-substituted succinic anhydride compound comprising unsaturated carbon moieties is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

If the mono-substituted succinic anhydride compound comprising unsaturated carbon moieties is a mixture of two or more kinds of alkenyl mono-substituted succinic anhydrides, it is appreciated that one alkenyl mono-substituted succinic anhydride is present in an amount of from 20 to 60 wt.-% and preferably of from 30 to 50 wt.-%, based on the total weight of the mono-substituted succinic anhydride provided.

For example, if the mono-substituted succinic anhydride compound comprising unsaturated carbon moieties is a mixture of two or more kinds of alkenyl mono-substituted succinic anhydrides comprising one or more hexadecenyl succinic anhydride(s), like linear or branched hexadecenyl succinic anhydride(s), and one or more octadecenyl succinic anhydride(s), like linear or branched hexadecenyl succinic anhydride(s), it is preferred that the one or more octadecenyl succinic anhydride(s) is present in an amount of from 20 to 60 wt.-% and preferably of from 30 to 50 wt.-%, based on the total weight of the mono-substituted succinic anhydride.

It is also appreciated that the mono-substituted succinic anhydride compound comprising unsaturated carbon moieties may be a mixture of alkyl mono-substituted succinic anhydrides and alkenyl mono-substituted succinic anhydrides.

In another embodiment, the surface-treatment agent may be a mono-substituted succinic acid compound comprising unsaturated carbon moieties or a mono-substituted succinic acid salt compound comprising unsaturated carbon moieties, wherein the mono-substituted succinic acid compound comprising unsaturated carbon moieties or the mono-substituted succinic acid salt compound comprising unsaturated carbon moieties is derived from the mono-substituted succinic anhydride compounds compound comprising unsaturated carbon moieties as described hereinabove.

Additionally or alternatively, the at least one unsaturated surface treatment agent is selected from unsaturated fatty acids and/or salts of unsaturated fatty acids.

The term "unsaturated fatty acid" in the meaning of the present invention refers to straight chain or branched chain, unsaturated organic compounds composed of carbon and hydrogen. Said organic compound further contains a carboxyl group placed at the end of the carbon skeleton.

The unsaturated fatty acid is preferably selected from the group consisting of myristoleic acid, palmitoleic acid, sapienic acid, oleic acid, elaidic acid, vaccenic acid, linoleic acid, α-linolenic acid, eicosapentaenoic acid, docosahexaenoic acid and mixtures thereof. More preferably, the surface treatment agent being an unsaturated fatty acid is selected from the group consisting of myristoleic acid, palmitoleic acid, sapienic acid, oleic acid, elaidic acid, vaccenic acid, linoleic acid, α-linolenic acid and mixtures thereof. Most preferably, the surface treatment agent being an unsaturated fatty acid is oleic acid and/or linoleic acid, preferably oleic acid or linoleic acid, most preferably linoleic acid.

Additionally or alternatively, the surface treatment agent is a salt of an unsaturated fatty acid.

The term "salt of unsaturated fatty acid" refers to an unsaturated fatty acid, wherein the active acid group is partially or completely neutralized. The term "partially neutralized" unsaturated fatty acid refers to a degree of neutralization of the active acid groups in the range from 40 and 95 mole-% preferably from 50 to 95 mole-%, more preferably from 60 to 95 mole-% and most preferably from 70 to 95 mole-%. The term "completely neutralized" unsaturated fatty acid refers to a degree of neutralization of the active acid groups of >95 mole-%, preferably of >99 mole-%, more preferably of >99.8 mole-% and most preferably of 100 mole-%. Preferably, the active acid groups are partially or completely neutralized.

The salt of unsaturated fatty acid is preferably a compound selected from the group consisting of sodium, potassium, calcium, magnesium, lithium, strontium, primary amine, secondary amine, tertiary amine and/or ammonium salts thereof, whereby the amine salts are linear or cyclic. For example, the surface treatment agent is a salt of oleic acid and/or linoleic acid, preferably oleic acid or linoleic acid, most preferably linoleic acid.

Additionally or alternatively, the at least one surface treatment agent is an unsaturated ester of phosphoric acid and/or a salt of an unsaturated phosphoric acid ester.

Thus, the unsaturated ester of phosphoric acid may be a blend of one or more phosphoric acid mono-ester and one or more phosphoric acid di-ester and optionally one or more phosphoric acid tri-ester. In one embodiment, said blend further comprises phosphoric acid.

For example, the unsaturated ester of phosphoric acid is a blend of one or more phosphoric acid mono-ester and one or more phosphoric acid di-ester. Alternatively, the unsaturated ester of phosphoric acid is a blend of one or more phosphoric acid mono-ester and one or more phosphoric acid di-ester and phosphoric acid. Alternatively, the unsaturated ester of phosphoric acid is a blend of one or more phosphoric acid mono-ester and one or more phosphoric acid di-ester and one or more phosphoric acid tri-ester. Alternatively, the unsaturated ester of phosphoric acid is a blend of one or more phosphoric acid mono-ester and one or more phosphoric acid di-ester and one or more phosphoric acid tri-ester and phosphoric acid.

For example, said blend comprises phosphoric acid in an amount of ≤8 mol.-%, preferably of ≤6 mol.-%, and more preferably of ≤4 mol.-%, like from 0.1 to 4 mol.-%, based on the molar sum of the compounds in the blend.

The term "phosphoric acid mono-ester" in the meaning of the present invention refers to an o-phosphoric acid molecule mono-esterified with one alcohol molecule selected from unsaturated, branched or linear, aliphatic or aromatic alcohols having a total amount of carbon atoms from $C_5$ to $C_{30}$, preferably from $C_8$ to $C_{22}$, more preferably from $C_8$ to $C_{20}$ and most preferably from $C_8$ to $C_{18}$ in the alcohol substituent.

The term "phosphoric acid di-ester" in the meaning of the present invention refers to an o-phosphoric acid molecule di-esterified with two alcohol molecules selected from the same or different, unsaturated, branched or linear, aliphatic or aromatic alcohols having a total amount of carbon atoms from $C_6$ to $C_{30}$, preferably from $C_8$ to $C_{22}$, more preferably from $C_8$ to $C_{20}$ and most preferably from $C_8$ to $C_{18}$ in the alcohol substituent.

The term "phosphoric acid tri-ester" in the meaning of the present invention refers to an o-phosphoric acid molecule tri-esterified with three alcohol molecules selected from the same or different, unsaturated, branched or linear, aliphatic or aromatic alcohols having a total amount of carbon atoms from $C_6$ to $C_{30}$, preferably from $C_8$ to $C_{22}$, more preferably from $C_8$ to $C_{20}$ and most preferably from $C_8$ to $C_{18}$ in the alcohol substituent.

Additionally or alternatively, the surface treatment agent is a salt of an unsaturated phosphoric acid ester. In one embodiment, the salt of an unsaturated phosphoric acid ester may further comprise minor amounts of a salt of phosphoric acid.

The term "salt of unsaturated phosphoric acid ester" refers to an unsaturated phosphoric acid ester, wherein the active acid group(s) is/are partially or completely neutralized. The term "partially neutralized" unsaturated phosphoric acid esters refers to a degree of neutralization of the active acid group(s) in the range from 40 and 95 mole-%, preferably from 50 to 95 mole-%, more preferably from 60 to 95 mole-% and most preferably from 70 to 95 mole-%. The term "completely neutralized" unsaturated phosphoric acid esters refers to a degree of neutralization of the active acid group(s) of >95 mole-%, preferably of >99 mole-%, more preferably of >99.8 mole-% and most preferably of 100 mole-%. Preferably, the active acid group(s) is/are partially or completely neutralized.

The salt of unsaturated phosphoric acid ester is preferably a compound selected from the group consisting of sodium, potassium, calcium, magnesium, lithium, strontium, primary amine, secondary amine, tertiary amine and/or ammonium salts thereof, whereby the amine salts are linear or cyclic.

Additionally or alternatively, the at least one surface treatment agent is abietic acid (also named: abieta-7,13-dien-18-oic acid, CAS-No.: 514-10-3).

Additionally or alternatively, the surface treatment agent is a salt of abietic acid.

The term "salt of abietic acid" refers to abietic acid, wherein the active acid groups are partially or completely neutralized. The term "partially neutralized" abietic acid refers to a degree of neutralization of the active acid groups in the range from 40 and 95 mol-%, preferably from 50 to 95 mol-%, more preferably from 60 to 95 mol-% and most preferably from 70 to 95 mol-%. The term "completely neutralized" abietic acid refers to a degree of neutralization of the active acid groups of >95 mol-%, preferably of >99 mol-%, more preferably of >99.8 mol-% and most preferably of 100 mol-%. Preferably, the active acid groups are partially or completely neutralized, more preferably completely neutralized.

The salt of abietic acid is preferably a compound selected from the group consisting of sodium, potassium, calcium, magnesium, lithium, strontium, primary amine, secondary amine, tertiary amine and/or ammonium salts thereof, whereby the amine salts are linear or cyclic.

According to another embodiment of the present invention, the at least one surface-treatment agent is an unsaturated trialkoxysilane, which is represented by the formula $R^3$—$Si(OR^4)_3$. Therein, the substituent $R^3$ represents any kind of unsaturated substituent, i.e., any branched, linear or cyclic alkene moiety having a total amount of carbon atoms from C2 to C30, such as a vinyl, allyl, propargyl, butenyl, crotyl, prenyl, pentenyl, hexenyl, cyclohexenyl or vinylphenyl moiety. $OR^4$ is a hydrolyzable group, wherein substituent $R^4$ represents any saturated or unsaturated, branched, linear, cyclic or aromatic moiety from having a total amount of carbon atoms from C1 to C30, such as a methyl, ethyl, propyl, allyl, butyl, butenyl, phenyl or benzyl group. According to a preferred embodiment, $R^4$ is a linear alkyl group having a total amount of carbon atoms from C1 to C15, preferably from C1 to C8 and most preferably from C1 to C2. According to an exemplified embodiment of the present invention the hydrolysable alkoxy group is a methoxy or an ethoxy group. Thus, specific or preferred examples of trialkoxysilanes comprising unsaturated carbon moieties suitable for use in the present invention include vinyltrimethoxysilane, vinyltriethoxysilane, allyltrimethoxysilane or allyltriethoxysilane. More preferably, the trialkoxysilane is selected from the group consisting of vinyltrimethoxysilane, vinyltriethoxysilane and mixtures thereof.

According to one embodiment of the present invention, the surface-treatment composition comprises a saturated surface-treatment agent, which is a phosphoric acid ester blend of one or more phosphoric acid mono-ester and/or salts thereof and/or one or more phosphoric acid di-ester and/or salts thereof.

In one embodiment of the present invention, the one or more phosphoric acid mono-ester consists of an o-phosphoric acid molecule esterified with one alcohol selected from saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from saturated, branched or linear, aliphatic or aromatic alcohols having a total amount of carbon atoms from C8 to C22, more preferably from C8 to C20 and most preferably from C8 to C18 in the alcohol substituent.

Alkyl esters of phosphoric acid are well known in the industry especially as surfactants, lubricants and antistatic agents (Die Tenside; Kosswig and Stache, Carl Hanser Verlag München, 1993).

The synthesis of alkyl esters of phosphoric acid by different methods and the surface treatment of minerals with alkyl esters of phosphoric acid are well known by the skilled man, e.g. from Pesticide Formulations and Application Systems: 17th Volume; Collins H M, Hall F R, Hopkinson M, STP1268; Published: 1996, U.S. Pat. Nos. 3,897,519 A, 4,921,990 A, 4,350,645 A, 6,710,199 B2, 4,126,650 A, 5,554,781 A, EP 1092000 B1 and WO 2008/023076 A1.

In one embodiment of the present invention, the one or more phosphoric acid mono-ester consists of an o-phosphoric acid molecule esterified with one alcohol selected from saturated and linear or branched and aliphatic alcohols having a total amount of carbon atoms from $C_6$ to $C_{30}$ in the alcohol substituent. For example, the one or more phosphoric acid mono-ester consists of an o-phosphoric acid molecule esterified with one alcohol selected from saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid mono-ester consists of an o-phosphoric acid molecule esterified with one alcohol selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the treatment layer of the surface-treated material product and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear or branched and aliphatic alcohols having a total amount of carbon atoms from C6 to C30 in the alcohol substituent. For example, the one or more phosphoric acid di-ester consists of an o-phosphoric acid molecule esterified with two alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl dodecylphosphoric acid di-ester and mixtures thereof.

According to another embodiment of the present invention, the surface-treatment composition comprises a saturated surface-treatment agent, which is at least one saturated aliphatic linear or branched carboxylic acid and/or salts thereof, preferably at least one aliphatic carboxylic acid having a total amount of carbon atoms from C4 to C24 and/or a salt thereof, more preferably at least one aliphatic carboxylic acid having a total amount of carbon atoms from C12 to C20 and/or a salt thereof, most preferably at least one aliphatic carboxylic acid having a total amount of carbon atoms from C16 to C18 and/or a salt thereof.

The aliphatic carboxylic acid in the meaning of the present invention may be selected from one or more linear chain, branched chain, saturated, and/or alicyclic carboxylic acids. Preferably, the aliphatic carboxylic acid is a mono-carboxylic acid, i.e. the aliphatic carboxylic acid is characterized in that a single carboxyl group is present. Said carboxyl group is placed at the end of the carbon skeleton.

In one embodiment of the present invention, the aliphatic linear or branched carboxylic acid and/or salt thereof is selected from saturated unbranched carboxylic acids, preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid, their salts, their anhydrides and mixtures thereof.

In another embodiment of the present invention, the aliphatic linear or branched carboxylic acid and/or salt thereof is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid, their salts, their anhydrides and mixtures thereof.

Preferably, the aliphatic carboxylic acid and/or a salt or anhydride thereof is stearic acid and/or a stearic acid salt or stearic anhydride.

According to another embodiment of the present invention, the surface-treatment composition comprises a saturated surface-treatment agent, which is at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof.

Accordingly, it should be noted that the at least one mono-substituted succinic anhydride may be one kind of mono-substituted succinic anhydride. Alternatively, the at least one mono-substituted succinic anhydride may be a mixture of two or more kinds of mono-substituted succinic anhydride. For example, the at least one mono-substituted succinic anhydride may be a mixture of two or three kinds of mono-substituted succinic anhydride, like two kinds of mono-substituted succinic anhydride.

In one embodiment of the present invention, the at least one mono-substituted succinic anhydride is one kind of mono-substituted succinic anhydride.

It is appreciated that the at least one mono-substituted succinic anhydride represents a surface treatment agent and consists of succinic anhydride mono-substituted with a group selected from any linear, branched, aliphatic, and cyclic group having a total amount of carbon atoms from C2 to C30 in the substituent.

In one embodiment of the present invention, the at least one mono-substituted succinic anhydride consists of succinic anhydride mono-substituted with a group selected from a linear, branched, aliphatic, and cyclic group having a total amount of carbon atoms from C3 to C20 in the substituent. For example, the at least one mono-substituted succinic anhydride consists of succinic anhydride mono-substituted with a group selected from a linear, branched, aliphatic, and cyclic group having a total amount of carbon atoms from C4 to C18 in the substituent.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched and aliphatic group having a total amount of carbon atoms from C2 to C30, preferably from C3 to C20 and most preferably from C4 to C18 in the substituent.

Thus, it is preferred that the at least one mono-substituted succinic anhydride consists of succinic anhydride mono-substituted with one group being a linear or branched, alkyl group having a total amount of carbon atoms from C2 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C2 to C30, preferably from C3 to C20 and most preferably from C4 to C18 in the substituent.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

Accordingly, it is appreciated that, e.g., the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that, e.g., the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

According to another embodiment of the present invention, the surface-treatment composition comprises a saturated surface-treatment agent, which is at least one polydialkylsiloxane.

Preferred polydialkylsiloxanes are described e.g. in US 2004/0097616 A1. Most preferred are polydialkylsiloxanes selected from the group consisting of polydimethylsiloxane, preferably dimethicone, polydiethylsiloxane and polymethylphenylsiloxane and/or mixtures thereof.

For example, the at least one polydialkylsiloxane is preferably a polydimethylsiloxane (PDMS).

According to yet another embodiment of the present invention, the surface-treatment composition comprises a saturated surface-treatment agent, which is at least one trialkoxysilane. A trialkyoxysilane is represented by the formula $R^5$—$Si(OR^4)_3$. Therein, the substituent $R^5$ represents any kind of saturated substituent, i.e., any branched, linear or cyclic alkane moiety having a total amount of carbon atoms from C1 to C30, such as a methyl, ethyl, propyl, allyl, butyl, butenyl, phenyl or benzyl group moiety, which optionally comprises a further substituent. The further substituent may be selected from the group consisting of a hydroxyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulfur-containing group, an isocyanate group or masked isocyanate group, a phenyl group, a benzyl group, and a benzoyl group, and preferably is selected from the group consisting of an amino group and a sulfur-containing group.

$OR^4$ is a hydrolyzable group, wherein substituent $R^4$ represents any saturated or unsaturated, branched, linear, cyclic or aromatic moiety from having a total amount of carbon atoms from C1 to C30, such as a methyl, ethyl, propyl, allyl, butyl, butenyl, phenyl or benzyl group. According to a preferred embodiment, $R^4$ is a linear alkyl group having a total amount of carbon atoms from C1 to C15, preferably from C1 to C8 and most preferably from C1 to C2. According to an exemplified embodiment of the present invention the hydrolysable alkoxy group is a methoxy or an ethoxy group. Thus, specific or preferred examples of the trialkoxysilane include methyltriethoxysilane, methyltrimethoxysilane, octyltrimethoxysilane, octyltriethoxysilane, dodecyltriethoxysilane, dodecyltrimethoxysilane, n-octadecyltriethoxysilane, n-octadecyltrimethoxysilane, phenyltriethoxysilane, phenyltrimethoxysilane, benzyltriethoxysilane, benzyltrimethoxysilane, aminoethyltriethoxysilane, aminomethyltriethoxysilane, aminopropyltriethoxysilane, aminopropyltrimethoxysilane, N-(aminoethyl)aminopropyltriethoxysilane, N-(aminoethyl)aminopropyltrimethoxysilane.

Preferably, the trialkoxysilane is a sulfur-containing trialkoxysilane, i.e., the substituent $R^5$ comprises at least one sulfur-containing functional group, such as a sulphonate group, a sulphide group, disulphide group, tetrasulfide group or a thiol group. Thus, specific and preferred examples include mercaptopropyltrimethoxysilane (MPTS), mercaptopropyltriethoxysilane, bis(triethoxysilylpropyl) disulfide (TESPD), bis(triethoxysilylpropyl) tetrasulfide (TESPT), bis(trithoxysilylpropyl) disulfide, bis(trithoxysilylpropyl) tetrasulfide and mixtures thereof. It is to be understood that a sulfur-containing trialkoxysilane can participate in a cross-linking reaction, i.e., can be crosslinked with the elastomer of the elastomer composition.

In another preferred embodiment, the trialkoxysilane is an amino-containing trialkoxysilane, i.e., the substituent $R^5$ comprises at least one primary, secondary or tertiary amino group, preferably at least one primary amino group —$NH_2$. More preferably, the trialkoxysilane is selected from the group consisting of 3-aminopropyltrimethoxysilane, 3-aminopropyltriethoxysilane, N-(aminoethyl)aminopropyltriethoxysilane, N-(aminoethyl)aminopropyltrimethoxysilane, and mixtures thereof, and most preferably is selected from the group consisting of 3-aminopropyltrimethoxysilane, 3-amino propyltriethoxysilane, and mixtures thereof.

In a preferred embodiment of the present invention, the surface-treatment composition comprises a surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties, sulfur-containing trialkoxysilanes and mixtures thereof, and optionally further comprises a saturated surface-treatment agent selected from the group consisting of I) a phosphoric acid ester blend of one or more phosphoric acid mono ester and/or salts thereof and/or one or more phosphoric acid di-ester and/or salts thereof, and/or II) at least one saturated aliphatic linear or branched carboxylic acid and/or salts thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof and/or III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or IV) at least one polydialkylsiloxane, and/or V) at least one trialkoxysilane other than a sulfur-containing trialkoxysilane and/or VI) mixtures of the materials according to I) to V).

In yet another embodiment of the present invention, the surface-treatment composition comprises a sulfur-containing trialkoxysilane, and optionally further comprises an unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof, or a saturated surface-treatment agent selected from the group consisting of I) a phosphoric acid ester blend of one or more phosphoric acid mono ester and/or salts thereof and/or one or more phosphoric acid di-ester and/or salts thereof, and/or II) at least one saturated aliphatic linear or branched carboxylic acid and/or salts thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from Cm to Cis and/or a salt thereof and/or III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or IV) at least one polydialkylsiloxane, and/or V) at least one trialkoxysilane other than a sulfur-containing trialkoxysilane and/or VI) mixtures of the materials according to I) to V).

Formation of the Treatment Layer

It is appreciated that the surface-treatment layer on at least a part of the porous filler is formed by contacting the filler material with the surface-treatment agent as described hereinabove. The porous filler is contacted with the surface-treatment composition in an amount from 0.07 to 9 mg/m² of the filler material surface, preferably 0.1 to 8 mg/m², more preferably 0.11 to 3 mg/m². That is, a chemical reaction may take place between the calcium carbonate-containing filler material and the surface treatment agent. In other words, the surface-treatment layer may comprise the surface treatment agent and/or salty reaction products thereof.

The term "salty reaction products" of the surface-treatment agent refers to products obtained by contacting the filler material with the surface-treatment composition comprising the surface-treatment agent. Said reaction products are formed between at least a part of the applied surface-treatment agent and reactive molecules located at the surface of the filler material.

For example, if the surface-treatment layer is formed by contacting the filler material with the mono- or di-substituted succinic anhydride containing compounds comprising unsaturated carbon moieties, the surface-treatment layer may further comprise a salt formed from the reaction of the mono- or di-substituted succinic anhydride containing compounds comprising unsaturated carbon moieties with the filler material. Likewise, if the surface-treatment layer is formed by contacting the filler material with stearic acid, the surface-treatment layer may further comprise a salt formed from the reaction of stearic acid with the calcium carbonate-containing filler material. Analogous reactions may take place when using alternative surface treatment agents according to the present invention.

According to one embodiment the salty reaction product(s) of the mono- or di-substituted succinic anhydride containing compounds comprising unsaturated carbon moieties are one or more calcium and/or magnesium salts thereof.

According to one embodiment the salty reaction product (s) of the mono- or di-substituted succinic anhydride containing compounds comprising unsaturated carbon moieties formed on at least a part of the surface of the calcium carbonate-comprising filler material are one or more calcium salts and/or one or more magnesium salts thereof.

According to one embodiment the molar ratio of the mono- or di-substituted succinic anhydride containing compounds comprising unsaturated carbon moieties to the salty reaction product(s) thereof is from 99.9:0.1 to 0.1:99.9, preferably from 70:30 to 90:10.

According to one embodiment of the present invention, the porous filler comprises, and preferably consists of, a filler material and a treatment layer comprising mono- or di-substituted succinic anhydride containing compounds comprising unsaturated carbon moieties and/or salt reaction products thereof. The treatment layer is formed on at least a part of the surface, preferably on the whole surface, of said filler material.

In one embodiment of the present invention, the treatment layer formed on the surface of the filler material comprises the at least one mono-substituted succinic anhydride comprising unsaturated carbon moieties and/or salty reaction products thereof obtained from contacting the filler material with the at least one mono-substituted succinic anhydride comprising unsaturated carbon moieties. For example, the treatment layer formed on the surface of the filler material comprises a maleic anhydride grafted polybutadiene homopolymer and/or an acid and/or salt thereof and/or salty reaction products thereof obtained from contacting the filler material with the maleic anhydride grafted polybutadiene homopolymer and/or the acid and/or salt thereof.

Methods for preparing the surface-treated filler material product treated with at least one phosphoric acid ester blend and suitable compounds for coating are described e.g. in EP 2 770 017 A1, which is thus incorporated herewith by reference.

Methods for preparing the surface-treated filler material product treated with at least one mono-substituted succinic anhydride consisting of succinic anhydride mono-substituted with a group selected from a linear, branched, aliphatic and cyclic group having a total amount of carbon atoms from at least C2 to C30 in the substituent and suitable compounds for coating are described e.g. in WO 2016/023937 A1, which is thus incorporated herewith by reference.

If the surface-treatment layer is formed by contacting the porous filler with a surface-treatment composition comprising two or more surface-treatment agents, it is to be understood that the two or more surface-treatment agents may be provided as a mixture prior to contacting the porous filler with the surface-treatment composition. Alternatively, the porous filler may be contacted with a surface-treatment composition comprising the first surface-treatment agent, and the second surface-treatment agent is added subsequently, that is, the surface-treatment composition is formed upon contacting the mixture of the porous filler and the first surface-treatment agent with the second surface-treatment agent.

In one embodiment of the present invention, the surface treatment is carried out in the wet state, i.e. the surface treatment is carried out in the presence of an aqueous solvent, preferably water.

Thus, the filler material may be provided in form of an aqueous suspension having a solids content in the range from 5 to 80 wt.-%, based on the total weight of the aqueous suspension. According to a preferred embodiment, the solids content of the aqueous suspension is in the range from 10 to 70 wt.-%, more preferably in the range from 15 to 60 wt.-% and most preferably in the range from 15 to 40 wt.-%, based on the total weight of the aqueous suspension.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water. Suitable wet surface-treatment processes are known to the skilled person, and taught, e.g., in EP 3 192 837 A1.

In another embodiment, the surface-modification is performed in the dry state, i.e. the surface treatment is carried out in the absence of solvents. In this embodiment, the filler material, which may contain a residual amount of moisture, e.g., less than 10 wt.-%, preferably less than 5 wt.-%, more preferably less than 3 wt.-%, is contacted with the surface-treatment composition, and subsequently mixed. Suitable dry surface-treatment processes are known to the skilled person.

In a preferred embodiment, the porous filler is formed from contacting a surface-reacted calcium carbonate, having a BET specific surface area of 20 to 200 m$^2$/g, preferably 40 to 150 m$^2$/g and more preferably 70 to 120 m$^2$/g, and a volume median particle size $d_{50}$ (vol) of 0.1 to 75 μm, preferably from 0.5 to 50 μm, more preferably from 1 to 40 μm, even more preferably from 1.2 to 30 μm, and most preferably from 1.5 to 15 μm, with a surface-treatment composition in an amount from 0.07 to 9 mg/m$^2$ of the filler material surface, preferably 0.1 to 8 mg/m$^2$, more preferably 0.11 to 3 mg/m$^2$, wherein the surface-treatment composition preferably comprises at least one unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, preferably a maleic anhydride grafted polybutadiene homopolymer or a maleic anhydride grafted polybutadiene-styrene copolymer and/or an acid and/or salt thereof, more preferably a maleic anhydride grafted polybutadiene homopolymer and/or an acid and/or salt thereof.

In another preferred embodiment, the porous filler is formed from contacting a precipitated hydromagnesite, having a BET specific surface area of 20 to 200 m$^2$/g, preferably 40 to 150 m$^2$/g and more preferably 70 to 120 m$^2$/g, and a volume median particle size $d_{50}$ (vol) of 0.1 to 75 μm, preferably from 0.5 to 50 μm, more preferably from 1 to 40 μm, even more preferably from 1.2 to 30 μm, and most preferably from 1.5 to 15 μm, with a surface-treatment composition in an amount from 0.07 to 9 mg/m$^2$ of the filler material surface, preferably 0.1 to 8 mg/m$^2$, more preferably 0.11 to 3 mg/m$^2$, wherein the surface-treatment composition preferably comprises at least one unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, preferably a maleic anhydride grafted polybutadiene homopolymer or a maleic anhydride grafted polybutadiene-styrene copolymer and/or an acid and/or salt thereof, more preferably a maleic anhydride grafted polybutadiene homopolymer and/or an acid and/or salt thereof.

In yet another particularly preferred embodiment, the filler material does not comprise a surface-treatment layer, that is, an untreated filler material is employed in the inventive use, the inventive process, the inventive composition or the inventive article, respectively. If the filler material does not comprise a surface-treatment layer, the porous filler preferably consists of the filler material. For example, the porous filler may consist of a surface-reacted calcium carbonate, having a BET specific surface area of 20 to 200 m$^2$/g, preferably 40 to 150 m$^2$/g and more preferably 70 to 120 m$^2$/g, and a volume median particle size $d_{50}$ (vol) of 0.1 to 75 µm, preferably from 0.5 to 50 µm, more preferably from 1 to 40 µm, even more preferably from 1.2 to 30 µm, and most preferably from 1.5 to 15 µm. Alternatively, the porous filler may consist of a precipitated hydromagnesite, having a BET specific surface area of 20 to 200 m$^2$/g, preferably 40 to 150 m$^2$/g and more preferably 70 to 120 m$^2$/g, and a volume median particle size $d_{50}$ (vol) of 0.1 to 75 µm, preferably from 0.5 to 50 µm, more preferably from 1 to 40 µm, even more preferably from 1.2 to 30 µm, and most preferably from 1.5 to 15 µm. Alternatively, the porous filler may consist of a mixture of a surface-reacted calcium carbonate having a BET specific surface area of 20 to 200 m$^2$/g, preferably 40 to 150 m$^2$/g and more preferably 70 to 120 m$^2$/g, and a volume median particle size $d_{50}$ (vol) of 0.1 to 75 µm, preferably from 0.5 to 50 µm, more preferably from 1 to 40 µm, even more preferably from 1.2 to 30 µm, and most preferably from 1.5 to 15 µm and a precipitated hydromagnesite having a BET specific surface area of 20 to 200 m$^2$/g, preferably 40 to 150 m$^2$/g and more preferably 70 to 120 m$^2$/g, and a volume median particle size $d_{50}$ (vol) of 0.1 to 75 µm, preferably from 0.5 to 50 µm, more preferably from 1 to 40 µm, even more preferably from 1.2 to 30 µm, and most preferably from 1.5 to 15 µm.

The Elastomer

The inventive use, the inventive process, the inventive composition and the inventive article relate to an elastomer composition. It is understood that an elastomer composition is a composition comprising an elastomer and further compounds, such as the porous filler as described hereinabove, and optionally other additives. Thus, it is a requirement of the inventive use, the inventive process, the inventive composition and the inventive article that the elastomer composition comprises an elastomer.

The elastomer of the present invention is a crosslinked polymer that shows rubber-like elasticity. Thus, it is understood that the elastomer of the present invention is formed by crosslinking of a crosslinkable polymer, also denoted as the elastomer precursor. Any crosslinking method, such as chemical crosslinking by crosslinking agents, vulcanization, crosslinking by ultraviolet light radiation, electron-beam radiation, nuclear radiation, gamma radiation, microwave radiation and/or ultrasonic radiation, is suitable for the purposes of the present invention.

The elastomer precursor of the present invention may comprise any kind of natural or synthetic rubber. For example, the elastomer may comprise an ethylene-propylene rubber, ethylene-propylene-diene rubber, nitrile-butadiene rubber, acrylonitrile-butadiene rubber, butyl rubber, styrene-butadiene rubber, polyisoprene, hydrogenated nitrile-butadiene rubber, polychloroprene, isobutene-isoprene rubber, chloro-isobutene-isoprene rubber, brominated isobutylene-isoprene rubber, acrylic rubbers, butadiene rubbers, epichlorohydrin rubbers, silicone rubbers, fluorocarbon rubbers, polyurethane rubbers, polysulfide rubbers, thermoplastic rubbers, and mixtures thereof. These types of rubber are well-known to the skilled person (see Winnacker/Küchler, "Chemische Technik. Prozesse and Produkte", 5$^{th}$ vol., 5$^{th}$ Ed., Wiley-VCH 2005, Ch. 4, pp. 821 to 896). Commonly, the rubbers are denoted in abbreviated form according to DIN ISO-R 1629:2015-03 or ASTM D1418-17. The elastomers according to the present invention are obtained by crosslinking of suitable elastomer precursors or "rubbers" described hereinbelow.

Natural rubber (NR) in the sense of the present invention is a polymeric material comprising polyisoprene, wherein the polyisoprene may be obtained from natural sources, such as the rubber tree (*Hevea brasiliensis*), spurges (*Euphorbia* spp.), dandelion (*Taxacum officinale* and *Taxacum koksaghyz*), Palaquium Gutta, rubber fig (*Ficus elastica*), bulletwood (*Manilkara bidentata*) or guayule (*Parthenium argentatum*). Depending on the source of natural rubber, the rubber may be present, e.g., as cautchouc (cis-1,4-polyisoprene), gutta-percha (trans-1,4-polyisoprene), or chicle (commonly a mixture of cis-1,4-polyisoprene and trans-1,4-polyisoprene).

Synthetic rubbers are commonly produced from radical, anionic, cationic or coordination polymerization from synthetic monomers, and subsequent crosslinking. The polymerization reaction may be performed, e.g., as polymerization in emulsion, solution, or suspension.

For example, ethylene-propylene rubber (EPR) is typically formed by radical copolymerization of ethylene and propylene. Optionally, small amounts (e.g., less than 10 mol-%, based on the total amount of monomers, preferably less than 5 mol-%) of diene monomers, such as butadiene, dicyclopentadiene, ethylidene norbornene or norbornadiene may be present. If a diene monomer is present during the copolymerization, the formed ethylene-propylene rubber is denoted as ethylene-propylene-diene rubber (EPDM) and comprises unsaturated carbon moieties, which may facilitate crosslinking of the obtained rubber. Alternatively, EPDM may be synthesized by coordination polymerization using vanadium-based catalysts, such as VCl$_4$ or VOCl$_3$.

Butadiene rubbers (BR) are commonly formed from coordination polymerization of butadiene in the presence of Ziegler-Natta catalysts, and also by anionic polymerization. The butadiene rubber thus obtained may have different structural units, such as cis-1,4-, trans-1,4- and 1,2-butadiene structural units, wherein the latter may be present in syndiotactic, isotactic and/or atactic form.

Styrene-butadiene rubbers (SBR) are copolymers of styrene and butadiene, which may be present as random copolymers or block-copolymers. Specific examples include E-SBR (i.e., SBR obtained by emulsion polymerization) and L-SBR (i.e., SBR obtained by anionic polymerization in solution).

Acrylonitrile-butadiene rubbers (NBR) typically are statistical copolymers of acrylonitrile and butadiene, which may comprise cis-1,4-, trans-1,4- and 1,2-butadiene and acrylonitrile structural units in varying amounts. The skilled person knows how to adjust the polymerization conditions in emulsion copolymerization, e.g., the monomer ratio, reaction time, reaction temperature, use of emulsifiers, accelerators (e.g., thiurams, dithiocarbamates, sulfonamides, benzothiazole disulfide) and chain terminating agents (such as dimehtyldithiocarbamate and diethyl hydroxylamine), in order to obtain a suitable distribution of these structural units. NBR may have a number average molecular weight $M_n$ in a broad range from 1500 g/mol to 1500 kg/mol, for example from 3000 g/mol to 1000 kg/mol, or from 5000 g/mol to 500 kg/mol. The acrylonitrile content may range from 10 mol-% to 75 mol-%, preferably from 15 to 60 mol-%, based on the total amount of monomer units. NBR may be resistant to oil, fuel and other non-polar chemicals, and therefore, is commonly applied in fuel and oil handling hoses, seals, grommets, and self-sealing fuel tanks, protective gloves, footwear, sponges, expanded foams, mats and in aeronautical applications. Mixtures of NBR with other rubbers, such as EPDM, or thermoplastic polymers, such as PVC, may also be employed.

Hydrogenated nitrile-butadiene rubber (HNBR) may be obtained by hydrogenation of NBR in the presence of hydrogenation catalysts, such as cobalt-, rhodium-, ruthenium-, iridium-, or palladium-based systems.

In another embodiment of the present invention, carboxylated NBR (XNBR) may be used, which may be obtained by copolymerization of butadiene and acrylonitrile with small amounts (e.g., less than 10 mol-%, preferably less than 5 mol-%, based on the total amount of monomers) of acrylic or methacrylic acid. XNBR may be crosslinked by the addition of metal salts, preferably multivalent metal salts, such as calcium salts, zinc salts, magnesium salts, zirconium salts, or aluminum salts, in addition or alternatively to the crosslinking methods described hereinbelow.

Polyisoprene, also termed isoprene rubber (IR), may be synthesized by anionic or Ziegler-Natta polymerization of isoprene, and may comprise cis-1,4-, trans-1,4-, 1,2-, and 3,4-isoprene structural units. The skilled person knows how to adjust the reaction conditions in order to obtain a suitable molar distribution of said building units.

Isobutene-isoprene rubbers (IIR), also termed butyl rubber, are typically synthesized by cationic polymerization starting from isobutene and isoprene monomer units in the presence of a catalyst, such as aluminum trichloride or dialkylaluminum chlorides. Halogenated IIR, such as chlorinated IIR (CIIR) or brominated IIR (BIIR) may suitably be obtained by post polymerization modification of IIR, e.g., chlorination using chlorine or bromination using bromine, which is typically performed under exclusion of light and temperatures in the range from 40 to 60° C. The halogen content of the halogenated IIRs preferably is in the range from 0.5 to 5 wt.-%, more preferably 1.0 to 2.5 wt.-%, based on the total weight of the halogenated IIR.

Polychloroprene, also denoted as chloroprene rubber (CR), may be produced by radical emulsion polymerization of chloroprene (2-chlorobutadiene). The polymer may primarily comprise trans-1,4-chloroprene and 1,2-chloroprene units in varying amounts, depending on the polymerization conditions, which may be suitably adapted by the skilled person. In addition or alternatively to the crosslinking methods hereinbelow, CR may be crosslinked at higher temperatures due to the extrusion of hydrochloric acid, optionally in the presence of an acid acceptor, such as a metal oxide or hydroxide, preferably zinc oxide, magnesium oxide, or combinations thereof. Said acid acceptor may be introduced into the elastomer already during polymerization or during mixing of the elastomer precursor with the remaining compounds of the elastomer composition.

Acrylic rubbers (ACM) may be synthesized by emulsion or suspension radical polymerization. Typical monomers comprise acrylic acid ester monomers, preferably comprising a saturated or unsaturated, linear or branched group comprising from 1 to 20 carbon atoms, preferably 1 to 8 carbon atoms. Suitable ACM are commercially available, e.g., under the tradenames Noxtite® ACM or Nipol® AR.

Epichlorohydrin rubbers may be obtained by ring-opening polymerization of epichlorohydrin, optionally further comprising monomers selected from the group comprising ethylene oxide, propylene oxide, and allylglycidyl ether, typically in the presence of a catalyst, such as trialkyl aluminum.

Silicone rubbers typically are poly(diorganyl)siloxanes and may be formed by hydrolysis-condensation of, e.g., diorganyldihalogenidosiloxanes. The organyl groups may be selected from the group comprising alkyl, aryl, and alkenyl groups.

Polyurethane rubbers comprise urethane structural building units formed from the reaction of isocyanates (i.e., diisocyanates and polyisocyanates) and alcohols (i.e., diols, triols, polyols).

Polysulfide rubbers may be formed from the polycondensation reaction of dihalides (X—R—X) with sodium polysulfides (Na—$S_x$—Na, with x≥2). Typical examples include Thiokol™ A, Thiokol™ FA, and Thiokol™ ST.

Thermoplastic rubbers (TPR or TPE) in the meaning of the present invention are materials, which show elastic properties, and processing properties of thermoplastic materials. The TPR may be selected from the group comprising block copolymers, such as styrene-diene block copolymers, styrene-ethylene-butylene rubbers, polyester TPE, polyurethane TPE or polyamide TPE, mixtures of elastomers and non-elastomers, such as mixtures of EPDM with PP and/or PE, mixtures of NR with polyolefins, or mixtures of IIR and polyolefins, and ionomeric polymers, for example zincous salts of sulfonated and maleinized EPDM.

A "fluorocarbon rubber" in the meaning of the present invention is a fluorine-containing polymer which has a low Tg value, e.g. a Tg value of less than 0° C., preferably less than −5° C., more preferably less than −10° C., and most preferably less than −15° C., and displays rubber-like elasticity (cf. IUPAC, Compendium of Chemical Terminology, 2nd Ed. (the "gold book"), 1997, "elastomer"). Fluorocarbon rubbers may be categorized according to ASTM D1418—"Standard Practice for Rubber and Rubber Latices—Nomenclature". ASTM D1418 specifies three classes of fluorocarbon rubbers:

FKM fluorocarbon rubbers: Fluororubber of the polymethylene type that utilizes vinylidene fluoride as a comonomer and have substituent fluoro, alkyl, perfluoroalkyl or perfluoroalkoxy groups in the polymer chain, with or without a curesite monomer. FFKM fluorocarbon rubbers: Perfluororubber of the polymethylene type having all substituent groups on the polymer chain either fluoro, perfluoroalkyl, or perfluoroalkoxy groups. FEPM fluorocarbon rubbers: Fluororubber of the polymethylene type containing one or more of the monomeric alkyl, perfluoroalkyl, and/or perfluoroalkoxy groups with or without a curesite monomer (having a reactive pendant group). Most preferably the crosslinkable fluorocarbon rubber is a copolymer of vinylidene fluoride, hexafluoropropylene, and tetrafluoroethylene.

Methods for producing the crosslinkable fluorine-containing polymer are known in the art. Alternatively, crosslinkable fluorine-containing polymers are commercially available. Examples of commercially available fluorocarbon rubbers are Viton®, Viton® Extreme™, and Kalrez® fluorocarbon rubbers of DuPont Corporation, Dyneon™ fluorocarbon rubbers of 3M Corporation, DAI-EL™ fluorocarbon rubbers of Daikin Industries, Technoflon® of Solvay S.

A., and Aflas® of Asahi Glass Co., Ltd. The skilled person will select the appropriate grade within these fluorocarbon rubber brands according to his needs.

Preferred rubbers according to the present invention are NBR, EPDM, NR, SBR, CIIR, BIIR and CR, wherein NBR and EPDM are especially preferred.

Further Components of the Elastomer Composition

In each of the aspects of the present invention, i.e., the inventive use, the inventive process, the inventive product, and the inventive article, the elastomer composition may further comprise additives, such as pigments, dyes, waxes, lubricants, oxidative- and/or UV-stabilizers, plasticizers, crosslinking agents, crosslinking coagents, compatibilizers, silanes, antioxidants, processing aids, further fillers and mixtures thereof.

According to one embodiment, the elastomer composition comprises a further filler. Preferably the further filler is selected from the group comprising carbon black, silica, ground natural calcium carbonate, precipitated calcium carbonate, nanofillers, graphite, clay, talc, diatomaceous earth, barium sulfate, titanium dioxide, wollastonite, and mixtures thereof, preferably ground natural calcium carbonate, precipitated calcium carbonate, barium sulfate, carbon black, and/or wollastonite. Preferably, the further filler is present in the elastomer composition in a volume ratio with the porous filler in the range from 10:90 to 90:10, preferably from 25:75 to 75:25, and more preferably from 40:60 to 60:40, for example 50:50.

In the meaning of the present invention, the term "nanofiller" relates to a material essentially insoluble in the elastomeric resin, and wherein the material has a volume median particle size $d_{50}$ below 0.5 µm.

In a preferred embodiment, the elastomer composition further comprises a crosslinking agent and/or a crosslinking coagent, wherein the crosslinking agent preferably is selected from the group consisting of peroxide crosslinking agents and/or sulfur-based crosslinking agents.

If the crosslinking agent is a peroxide, the crosslinking agent can be selected from a very wide range, including peresters, perketals, hydroperoxides, peroxydicarbonates, diacyl peroxides and ketone peroxides. Examples of such peroxides include t-butyl peroctanoate, perbenzoate, methyl ethyl ketone peroxide, cyclohexanone peroxide, acetyl acetone peroxide, dibenzoyl peroxide, bis(4-t-butyl-cyclohexyl) peroxydicarbonate, dicumyl peroxide, 1,1-bis(tert-butylperoxy)-3,3,5-trimethylcyclohexane, 2,5-bis-(t-butylperoxy)-2,5-dimethylhexane, 2,5-bis-(t-butylperoxy)-2,5-dimethylhexyne, or α,α'-bis(t-butylperoxy) diisopropylbenzene, diisopropyl peroxydicarbonate, 1,1-bis (tert-hexylperoxy)-3,5,5-trimethylcyclohexane, 2,5-dimethylhexane-2,5-dihydroperoxide, di-tert-butyl peroxide, tert-butylcumyl peroxide, 2,5-dimethyl-2,5-bis (tert-butylperoxy)hexane, 2,5-dimethyl-2,5-bis(tert-butylperoxy)-3-hexine, tert-butyl peroxybenzoate, 2,5-dimethyl-2, 5-bis(benzoylperoxy)hexane, tert-butyl peroxymaleate or tert-hexylperoxyisopropyl monocarbonate and the like. If desired, a mixture of two or more peroxides can be used.

Preferably the peroxide crosslinking-agents may be used in combination with a crosslinking coagent. Examples of suitable coagents are 1,2-polybutadiene, ethylene glycol dimethacrylate, triallyl phosphate, triallylisocyanurate, m-phenylenediamie-bis-maleimide or triallylcyanurate.

The sulphur based crosslinking agent can be elemental sulphur or a sulphur-containing system, such as thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazole sulfenamide, N-tert-butyl-2-benzothiazole sulfenamide (TBBS) and the like; 2-mercaptoimidazoline, N,N-diphenylguanadine, N,N-di-(2-methylphenyl)-guanadine, thiazole accelerators such as 2-mercaptobenzothiazole, 2-(morpholinodithio)benzothiazole disulfide, zinc 2-mercaptobenzothiazole and the like; dithiocarbamates accelerators such as tellurium diethyldithiocarbamate, copper dimethyldithiocarbamate, bismuth dimethyldithiocarbamate, cadmium diethyldithiocarbamate, lead dimethyldithiocarbamate, zinc diethyldithiocarbamate and zinc dimethyldithiocarbamate. If desired, a mixture of two or more sulphur based crosslinking agents can be used.

Alternatively, the crosslinking agent may be selected from bisphenol-based crosslinking agents, or amine or diamine-based crosslinking agents. Examples of suitable amine crosslinking-agents are butylamine, dibutylamine, piperidine, trimethylamine, or diethylcyclohexylamine. Examples of suitable diamine crosslinking-agents are bis-cinnamylidene hexamethylene diamine, hexamethylene diamine carbamate, bis-peroxycarbamate such as hexamethylene-N, N'bis(tert-butyl peroxycarbamate or methylene bis-4-cyclohexyl-N,N'(tert-butylperoxycarbamate), piperazine, triethylene diamine, tetramethylethyldiamine, or diethylene triamine.

Examples of suitable bisphenol crosslinking-agents are 2,2-bis(4-hydroxyphenyl)hexafluoropropane, substituted hydroquinone, 4,4'-disubstituted bisphenol, or hexafluorobisphenol A.

It should be understood that the crosslinking agent and crosslinking coagent react with the elastomer precursor during the crosslinking step, and thus, may form a part of the elastomer in the elastomer composition. Furthermore, the elastomer composition thus may comprise reaction products of the crosslinking agent and/or the crosslinking coagent.

The Inventive Use

According to a first aspect of the present invention, the use of a porous filler for reducing the gas permeability of a crosslinked elastomer composition is provided. The porous filler comprises a filler material selected from the group consisting of surface-reacted calcium carbonate, precipitated hydromagnesite and mixtures thereof, wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source and mixtures thereof.

It is appreciated that the porous filler and the elastomer composition are described hereinabove.

In the present invention, the porous filler preferably is incorporated into the elastomer composition prior to crosslinking. For example, the porous filler may be incorporated into the elastomer composition by a process as described hereinbelow. Accordingly, it is preferred that the porous filler is uniformly distributed in the elastomer composition. Therefore, it may be preferable that the porous filler comprises a surface-treatment layer as described hereinabove. If the porous filler comprises a surface-treatment layer formed from a surface-treatment composition comprising a surface-treatment agent having an unsaturated carbon moiety, said carbon moiety upon crosslinking may react in a similar way as the elastomer precursor, and thus, the porous filler may become crosslinked with the elastomer precursor to form the elastomer composition. The crosslinking of the porous filler within the elastomer may positively influence the gas permeability and mechanical properties of the elastomer composition.

However, it is not a requirement of the present invention that the filler comprises a surface-treatment. A method for the uniform distribution of uncoated porous fillers in polymers, such as the elastomer precursor of the present invention, is described, e.g., in WO 2015/097031 A1.

The inventors surprisingly found that a porous filler according to the invention, which is incorporated into an elastomer composition, reduces the gas permeability of said elastomer composition.

The "reduction" of the gas permeability of an elastomer composition, can be reflected or tested in that the gas permeability of an elastomer composition, comprising the inventive porous filler, is lower than the gas permeability of the same elastomer composition, wherein the porous filler is replaced by an isovolumic amount of carbon black, wherein the carbon black has a statistical thickness surface area (STSA) of 39±5 $m^2/g$, measured according to ASTM D 6556-19. For the purposes of the present invention, the gas permeability is represented by the air permeability as measured according to NF ISO 2782-1:2018. It is to be understood that the elastomer composition comprising the inventive porous filler has a reduced gas permeability, which may alternatively be reflected by a comparison to an otherwise identical composition, which does not comprise any filler.

By "the same elastomer composition", it is meant that an elastomer composition comprising an isovolumic amount of carbon black instead of the inventive porous filler, all else being equal, is produced in the same way as the inventive elastomer composition, i.e., following the same method steps for its production and using the same remaining compounds other than the replaced porous filler. However, it is to be understood that the porous filler does not have to be completely replaced. For example, it is sufficient that only 80 wt.-%, 60 wt.-%, 50 wt.-%, 40 wt.-% or 20 wt.-% of the porous filler, based on the total amount of the porous filler in the inventive composition, are replaced by an isovolumic amount of carbon black. Thus, the porous filler and carbon black may be present, e.g., in a volume ratio in the range from 10:90 to 90:10, preferably from 25:75 to 75:25, and more preferably from 40:60 to 60:40, for example 50:50.

The wording "isovolumic amount" indicates that the amount of the porous filler is replaced by an amount of carbon black, which has the same volume as the replaced porous filler, such that the final volume of both elastomer compositions is identical.

It is appreciated that the carbon black has a statistical thickness surface area (STSA) of 39±5 $m^2/g$, measured according to ASTM D 6556-19. Such carbon black is commercially available, for example under the designation "N550". In a preferred embodiment, the gas permeability of the inventive elastomer composition is reduced compared to the same elastomer composition, wherein the porous filler is replaced by an isovolumic amount of carbon black N550.

In a preferred embodiment of the invention, the air permeability of the elastomer composition is decreased by at least 5%, preferably at least 10%, more preferably at least 15%, compared to the same elastomer composition, wherein the porous filler is replaced by carbon black in an isovolumic amount, wherein the carbon black has a statistical thickness surface area (STSA) of 39±5 $m^2/g$, measured according to ASTM D 6556-19.

Without wishing to be bound by any particular theory, it is believed that the porous structure of the porous filler, whose solid material is essentially impenetrable for gases, lengthens the way for the gas protruding through the elastomer composition, respectively creates a more tortuous path for said gas. This is particularly surprising, since a porous filler typically may host larger amounts of gas in its pores, compared to a filler having a low porosity.

Furthermore, the inventive use preferably at the same time allows for a retention or improvement of the mechanical properties, such as the Shore A hardness, tear resistance, tensile strength or abrasion resistance. Thus, preferably the Shore A hardness of the elastomer composition is increased, preferably by at least 3%, more preferably at least 8%, and most preferably at least 10%, compared to the same elastomer composition, wherein the porous filler is replaced by carbon black in an isovolumic amount, wherein the carbon black has a statistical thickness surface area (STSA) of 39±5 $m^2/g$, measured according to ASTM D 6556-19. The Shore A hardness is measured according to NF ISO 7619-1:2010.

Preferably, the tear resistance of the elastomer composition is increased, preferably by at least 5%, more preferably at least 10%, and most preferably at least 15%, compared to the same elastomer composition, wherein the porous filler is replaced by carbon black in an isovolumic amount, wherein the carbon black has a statistical thickness surface area (STSA) of 39±5 $m^2/g$, measured according to ASTM D 6556-19. The tear resistance is measured according to NF ISO 34-2:2015.

Preferably, the tensile strength of the elastomer composition is essentially maintained or increased, preferably by at least 5%, more preferably at least 10%, and most preferably at least 15%, compared to the same elastomer composition, wherein the porous filler is replaced by carbon black in an isovolumic amount, wherein the carbon black has a statistical thickness surface area (STSA) of 39±5 $m^2/g$, measured according to ASTM D 6556-19. The tensile strength is measured according to NF ISO 37:2017.

Preferably, the abrasion of the elastomer composition is decreased, preferably by at least 10%, more preferably at least 20%, and most preferably at least 30%, compared to the same elastomer composition, wherein the porous filler is replaced by carbon black in an isovolumic amount, wherein the carbon black has a statistical thickness surface area (STSA) of 39±5 $m^2/g$, measured according to ASTM D 6556-19. The abrasion is measured according to NF ISO 4649:2017.

Surprisingly, the inventive use of the porous filler allows for a reduction of the gas permeability of an elastomer composition, while at the same time, the mechanical properties, such as Shore A hardness, tear resistance or tensile modulus, are only minimally affected or improved. On the contrary, conventional fillers for reducing the gas permeability tend to weaken the mechanical properties of the elastomer composition, such as the Shore A hardness, tensile strength or the abrasion resistance.

In a preferred embodiment, the porous filler is contained in the elastomer composition in an amount in the range from 5 to 175 parts per hundred (phr), preferably from 10 to 160 parts per hundred, more preferably from 30 to 150 parts per hundred, based on the total weight of the elastomer precursor in the elastomer composition. Additionally or alternatively, the porous filler is contained in the elastomer composition in an amount in the range from 5 to 250 parts per hundred (pph), preferably 15 to 200 parts per hundred, based on the total weight of the elastomer composition.

The Inventive Process

According to a second aspect of the present invention, a process for the preparation of an elastomer composition having a reduced gas permeability is provided, comprising the following steps:
a) providing a crosslinkable polymer,
b) providing a porous filler comprising a filler material selected from the group consisting of surface-reacted calcium carbonate, precipitated hydromagnesite and mixtures thereof,
   wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source and mixtures thereof,
c) optionally providing a further filler, preferably selected from the group consisting of carbon black, silica, ground natural calcium carbonate, precipitated calcium carbonate, talc, clay, kaolin, nanofillers and mixtures thereof,
d) mixing, in any order, the crosslinkable polymer of step a), the porous filler of step b) and optionally the second filler of step c) to form a mixture, and
e) crosslinking the mixture obtained in step d) to form an elastomer composition having a reduced gas permeability.

According to step a) of the inventive process, a crosslinkable polymer is provided. The crosslinkable polymer is any kind of elastomer precursor, which may be used to produce an elastomer as described hereinabove.

According to step b) of the inventive process, a porous filler comprising a filler material selected from the group consisting of surface-reacted calcium carbonate, precipitated hydromagnesite and mixtures thereof is provided as described hereinabove.

The porous filler may comprise a surface-treatment layer on at least a part of the surface of the filler material, wherein the surface-treatment layer is formed by contacting the filler material with a surface-treatment composition in an amount from 0.07 to 9 mg/m² of the filler material surface, preferably 0.1 to 8 mg/m², more preferably 0.11 to 3 mg/m², and wherein the surface-treatment composition comprises a surface-treatment agent preferably selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof, as described hereinabove, and/or the surface-treatment composition comprises at least one saturated surface-treatment agent selected from the group consisting of I) a phosphoric acid ester blend of one or more phosphoric acid mono-ester and/or salts thereof and/or one or more phosphoric acid di-ester and/or salts thereof, and/or II) at least one saturated aliphatic linear or branched carboxylic acid and/or salts thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof and/or III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or IV) at least one polydialkylsiloxane, and/or V) at least one trialkoxysilane, preferably a sulfur-containing trialkoxysilane or an amino-containing trialkoxysilane and/or VI) mixtures of the materials according to I) to V), as described hereinabove.

The porous filler may be added to the elastomer composition in an amount in the range from 5 to 175 parts per hundred (phr), preferably from 10 to 160 parts per hundred, more preferably from 30 to 150 parts per hundred, based on the total weight of the elastomer in the elastomer composition.

According to step c) of the inventive process, optionally a further filler is provided. It is to be noted that the further filler may be any kind of filler commonly known to the skilled person. Preferably, the further filler is selected from the group consisting of carbon black, silica, ground natural calcium carbonate, precipitated calcium carbonate, talc, silanized talc, clay, kaolin, nanofillers and mixtures thereof.

According to a preferred embodiment, the volume ratio of the porous filler to the further filler is in the range from 10:90 to 90:10, preferably from 25:75 to 75:25, and more preferably from 40:60 to 60:40.

According to step d) of the inventive process, the crosslinkable polymer of step a), the porous filler of step b) and optionally the second filler of step c) are mixed in any order to form a mixture.

Mixing step d) may be performed by any means known to the skilled person, including, but not limited to, blending, extruding, kneading, and high-speed mixing.

Preferably, mixing step d) is performed in an internal mixer and/or external mixer, wherein the external mixer preferably is a cylinder mixer.

During mixing step d), optionally one or more additives, which are well known to the skilled person, may be added to the mixture as described hereinabove. Such additives comprise, without being limited to, pigments, dyes, waxes, lubricants, oxidative- and/or UV-stabilizers, plasticizers, compatibilizers, silanes, crosslinking agents, crosslinking coagents, antioxidants, processing aids and/or mixtures of the foregoing. Preferred pigments are titanium dioxide as white pigment and color pigments, such as blue, green and red pigments.

According to step e) of the inventive process, the mixture of step d) is crosslinked to form an elastomer composition. The crosslinking step may be performed by any method known to the skilled person.

Preferably, crosslinking step e) is performed by the addition of a crosslinking agent and a crosslinking coagent and subsequent thermal crosslinking. The mixture is heated to a temperature sufficiently high to allow for the crosslinking agent to react with the crosslinkable polymer, for example at least 100° C., preferably at least 150° C., more preferably at least 180° C. Optionally, the thermal crosslinking step may be performed in combination with compression molding. During compression molding, pressure is applied to force the mixture into the defined shape of the mold, such that the mixture is in contact with all areas of the mold, and the mixture is crosslinked in the mold, such that the elastomer composition retains the desired shape. Preferably, compression molding is performed at a pressure of at least 100 bar, preferably of at least 150 bar, and more preferably of at least 200 bar.

Suitable crosslinking agents are those referred to hereinabove.

In another preferred embodiment of the present invention, crosslinking is performed by energy-intense radiation, such as ultraviolet light radiation, electron-beam radiation, nuclear radiation, gamma radiation, microwave radiation and/or ultrasonic radiation.

In a preferred embodiment, the inventive process further comprises a step b1) of forming the surface-treatment layer on at least a part of the porous filler by contacting the filler material with the surface-treatment composition in an amount from 0.07 to 9 mg/m$^2$ of the filler material surface, preferably 0.1 to 8 mg/m$^2$, more preferably 0.11 to 3 mg/m$^2$. Step b1) may be performed prior to mixing step d) as described hereinabove. Alternatively, step b1) may be performed during mixing step d) by admixing in step d), in any order, the porous filler and the surface-treatment composition with the crosslinkable polymer of step a), optionally the second filler of step c) and optionally one or more additives as described hereinabove. In this embodiment, the surface-treatment layer is formed in situ during the mixing step d).

The Inventive Elastomer Composition

A third aspect of the present invention relates to an elastomer composition having a reduced gas permeability formed from a composition comprising a crosslinkable polymer, a porous filler selected from the group consisting of surface-reacted calcium carbonate, precipitated hydromagnesite and mixtures thereof, and a further filler, preferably selected from the group consisting of carbon black, silica, ground natural calcium carbonate, precipitated calcium carbonate, talc, nanofillers, and mixtures thereof.

The crosslinkable polymer, the porous filler and the further filler are as described hereinabove. In particular, the porous filler may comprise a surface-treatment layer as described hereinabove.

It should be understood that the elastomer composition of the present aspect is formed from a composition comprising the compounds as defined above. Thus, the elastomer composition of the present aspect is obtained by crosslinking of the crosslinkable polymer in the composition in the presence of the further compounds.

The inventive elastomer composition may be obtained by a process as described hereinabove.

In a preferred embodiment, the volume ratio of the porous filler to the further filler is in the range from 10:90 to 90:10, preferably from 25:75 to 75:25, and more preferably from 40:60 to 60:40, for example 50:50. The applicants surprisingly found out that the partial replacement of a conventional filler, such as the further filler, may reduce the gas permeability of the elastomer composition, while at the same time the mechanical properties remain unaffected or are improved.

According to another preferred embodiment, the porous filler further comprises a surface-treatment layer on at least a part of the surface of the filler material, wherein the surface-treatment layer is formed by contacting the filler material with a surface-treatment composition in an amount from 0.07 to 9 mg/m$^2$ of the filler material surface, preferably 0.1 to 8 mg/m$^2$, more preferably 0.11 to 3 mg/m$^2$, and wherein the surface-treatment composition preferably comprises a surface-treatment agent preferably selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof, more preferably selected from the group consisting of a) sodium, potassium, calcium, magnesium, lithium, strontium, primary amine, secondary amine, tertiary amine and/or ammonium salts, whereby the amine salts are linear or cyclic, of mono- or di-substituted succinic acids, whereby one or both acid groups can be in the salt form, preferably both acid groups are in the salt form; unsaturated fatty acids, preferably oleic acid and/or linoleic acid; unsaturated esters of phosphoric acid; abietic acid and/or mixtures thereof, preferred are completely neutralized surface treatment agents; and/or b) a maleic anhydride grafted polybutadiene homopolymer or a maleic anhydride grafted polybutadiene-styrene copolymer and/or an acid and/or salt thereof, preferably a maleic anhydride grafted polybutadiene homopolymer having
  i) a number average molecular weight $M_n$ measured by gel permeation chromatography from 1 000 to 20 000 g/mol, preferably from 1 400 to 15 000 g/mol, and more preferably from 2 000 to 10 000 g/mol measured according to EN ISO 16014-1:2019, and/or
  ii) a number of anhydride groups per chain in the range from 2 to 12, preferably from 2 to 9, and more preferably from 2 to 6, and/or
  iii) an anhydride equivalent weight in the range from 400 to 2 200, preferably from 500 to 2 000, and more preferably from 550 to 1 800, and/or
  iv) an acid number in the range from 10 to 300 meq KOH per g of maleic anhydride grafted polybutadiene homopolymer, preferably 20 to 200 meq KOH/g, more preferably 30 to 150 meq KOH/g, measured according to ASTM D974-14, and/or
  v) a molar amount of 1,2-vinyl groups in the range from 5 to 80 mol-%, preferably 10 to 60 mol-%, more preferably 15 to 40 mol-%, based on the total amount of unsaturated carbon moieties in the maleic anhydride grafted polybutadiene homopolymer, and/or an acid and/or salt thereof.

According to yet another embodiment, the surface-treatment composition comprises at least one saturated surface-treatment agent selected from the group consisting of I) a phosphoric acid ester blend of one or more phosphoric acid mono-ester and/or salts thereof and/or one or more phosphoric acid di-ester and/or salts thereof, and/or II) at least one saturated aliphatic linear or branched carboxylic acid and/or salts thereof, preferably at least one aliphatic carboxylic acid having a total amount of carbon atoms from $C_4$ to $C_{24}$ and/or a salt thereof, more preferably at least one aliphatic carboxylic acid having a total amount of carbon atoms from $C_{12}$ to $C_{20}$ and/or a salt thereof, most preferably at least one aliphatic carboxylic acid having a total amount of carbon atoms from $C_{16}$ to $C_{18}$ and/or a salt thereof and/or III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salts thereof, and/or IV) at least one polydialkylsiloxane, and/or V) at least one trialkoxysilane, preferably a sulfur-containing trialkoxysilane or an amino-containing trialkoxysilane and/or VI) mixtures of the materials according to I) to V).

The inventors surprisingly found that the beneficial properties of a surface-treatment layer may be obtained also with saturated surface-treatment agents, and/or combinations of saturated and unsaturated surface-treatment agents.

According to still another embodiment, the porous filler is contained in the elastomer composition in an amount in the range from 5 to 175 parts per hundred (phr), preferably from 10 to 160 parts per hundred, more preferably from 30 to 150 parts per hundred, based on the total weight of the crosslinkable polymer in the elastomer composition.

According to a preferred embodiment, the elastomer composition comprises an elastomer formed from a crosslinkable polymer selected from natural or synthetic rubbers, such as ethylene-propylene rubber, ethylene-propylene-diene rubber, nitrile-butadiene rubber, acrylonitrile-butadiene rubber, butyl rubber, styrene-butadiene rubber, polyisoprene, hydrogenated nitrile-butadiene rubber, polychloroprene, isobutene-isoprene rubber, chloro-isobutene-isoprene rubber, brominated isobutylene-isoprene rubber, acrylic rubbers, butadiene rubbers, epichlorhydrin rubbers, silicone rubbers, fluorocarbon rubbers, polyurethane rubbers, polysulfide rubbers, thermoplastic rubbers, and mixtures thereof.

According to another preferred embodiment, the elastomer composition further comprises additives, such as pigments, dyes, waxes, lubricants, oxidative- and/or UV-stabilizers, plasticizers, crosslinking agents, crosslinking coagents, compatibilizers, silanes, antioxidants, processing aids and mixtures thereof.

According to still another preferred embodiment, the Shore A hardness of the elastomer composition is increased, preferably by at least 3%, more preferably by at least 8%, compared to the same elastomer composition, wherein the porous filler is replaced by carbon black in an isovolumic amount, and/or the air permeability is decreased, preferably by at least 5%, more preferably at least 10%, and most preferably at least 15%, compared to the same elastomer composition, wherein the porous filler is replaced by carbon black in an isovolumic amount, wherein the carbon black has a statistical thickness surface area (STSA) of 39±5 m$^2$/g, measured according to ASTM D 6556-19, and wherein the Shore A hardness is measured according to NF ISO 7619-1:2010 and the air permeability is measured according to NF ISO 2782-1:2018.

According to one embodiment, the Shore A hardness of the elastomer composition is increased, preferably by at least 3%, more preferably by at least 8%, compared to the same elastomer composition not comprising any filler, and/or the air permeability is decreased, preferably by at least 5%, more preferably at least 10%, and most preferably at least 15%, compared to an otherwise identical composition, which does not comprise any filler and/or the air permeability is decreased, preferably by at least 5%, more preferably at least 10%, and most preferably at least 15%, compared to an otherwise identical composition, which does not comprise any filler.

The Inventive Article

According to a fourth aspect of the present invention, an article comprising the inventive elastomer composition is provided. The article is preferably selected from the group comprising tubeless articles, membranes, sealings, O-rings, gloves, pipes, cables, electrical connectors, oil hoses, balls (e.g., footballs, basketballs, baseballs, golf balls or rugby balls) and shoe soles.

EXAMPLES

Measuring Methods

The number-average molecular weight $M_n$ is measured by gel permeation chromatography, according to ISO 16014-1:2019 and ISO 16014-2/2019.

The Brookfield viscosity is measured by a Brookfield DV-III Ultra viscometer at 24° C.±3° C. at 100 rpm using an appropriate spindle of the Brookfield RV-spindle set and is specified in mPa·s. Once the spindle has been inserted into the sample, the measurement is started with a constant rotating speed of 100 rpm. The reported Brookfield viscosity values are the values displayed 60 seconds after the start of the measurement. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

The acid number is measured according to ASTM D974-14.

The specific surface area (in m$^2$/g) is determined using the BET method (using nitrogen as adsorbing gas), which is well known to the skilled man (ISO 9277:2010). The total surface area (in m$^2$) of the filler material is then obtained by multiplication of the specific surface area and the mass (in g) of the corresponding sample.

The iodine number is measured according to DIN 53241/1.

Volume median particle size $d_{50}$ is evaluated using a Malvern Mastersizer 2000 Laser Diffraction System. The $d_{50}$ or $d_{98}$ value, measured using a Malvern Mastersizer 2000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median grain diameter is determined by the sedimentation method, which is an analysis of sedimentation behaviour in a gravimetric field. The measurement is made with a Sedigraph™ 5100 or 5120, Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine the particle size of fillers and pigments.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds.

The sample material is sealed in a 3 cm³ penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p. 1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Analysis on Elastomer Samples:

For all tests on the elastomer compositions, a minimum period of 16 h was kept between molding and testing of the rubber samples. The samples were kept in a controlled environment (temperature: 23±2° C., relative humidity: 50±5%).

Tear Resistance

Tear resistance (DELFT) was measured according to NF ISO 34-2:2015 on a Zwick Z005 or Z100 device using the parameters outlined in Table 1.

TABLE 1

Tear resistance (DELFT) measurement parameters.

| | |
|---|---|
| Standard: | NF ISO 34-2 |
| Type of test piece: | Delft |
| Preparation of test piece: | Samples were cut from sheets of 2 ± 0.2 mm thickness |
| Cutting direction | perpendicular to calendering direction |
| State: | Initial |
| Temperature: | 23 ± 2° C. |
| Relative Humidity: | 50 ± 5% |
| Number of test pieces used: | 3 |
| Test specimen conditioning before test: | Minimum 16 h at 23° C. and 50% RH |
| Rate of grip separation: | 500 mm/min |

Hardness Shore A

Hardness (Shore A) was measured according to NF ISO 7619-1 on a Bareiss Digitest II apparatus using the parameters outlined in Table 2.

TABLE 2

Hardness (Shore A) measurement parameters.

| | |
|---|---|
| Standard: | NF ISO 7619-1 or NF ISO 48-4 (EPDM series 3) |
| Type of device: | A |
| Type of test piece: | 50 × 25 × (2.0 ± 0.2) mm |
| Number of test pieces used: | 3 |
| Test carry out: | 3 s |
| Preparation of test piece: | Samples were cut from sheets of 2 ± 0.2 mm thickness |
| State: | Initial |
| Temperature: | 23 ± 2°C |
| Relative Humidity: | 50 ± 5% |
| Number of measurements: | 5 |
| Unit: | points |
| Test specimen conditioning before test: | Minimum 16 h at 23° C. and 50% RH |

Gas Permeability

As indicated by NF ISO 2782-1, the gas permeability of a rubber film may be defined as the rate at which it is penetrated by a certain gas. Permeability can be expressed in terms of liters of gas per square meter of rubber per 24 hours. The tests were conducted by introducing a round rubber sample in a hermetically closed chamber. The pressure was measured on both sides of the chamber and an absolute 4 bar pressure of air was introduced in one side of the chamber. The permeability was determined by the time needed for the air to pass through the rubber. The tests were conducted at 60° C. and 50% relative humidity, using Air (79% Nitrogen and 21% Oxygen gas). The samples were let to heat for 30 min before each test. All tests were held until there was at least a 0.3 bar increase in pressure in the lower chamber. The air permeability is given in $(m^2 \, Pa^{-1} \, s^{-1})$.

Tensile Test & Modulus M50

Tensile test including M50 measurement were measured according to NF ISO 37:2017-11 on a Zwick Roell Z005, device using the parameters outlined in Table 3.

TABLE 3

Tensile test and modulus M50 measurement parameters.

| | |
|---|---|
| Standard | NF ISO 37:2017-11 |
| Type of test piece | Type H2 |
| Preparation of test piece | Samples were cut from sheets of 2 ± 0.2 mm thickness |
| Cutting direction | Parallel of calendering direction |
| State | Initial |
| Temperature | 23 ± 2° C. |
| Relative humidity | 50 ± 5% |
| Number of test pieces used | 3 |
| Units | MPa for strength, % for elongation |
| Test specimen conditioning before test | Minimum 16 h at 23° C. and 50% relative humidity |
| Conditioning after ageing in air | None |
| Conditioning after immersion | None |
| Rate of grip separation | 500 mm/min |

Materials

Treatment A

Treatment A is a low molecular weight polybutadiene functionalized with maleic anhydride ($M_n$=3100 Da, Brookfield viscosity: 6500 cps+/−3500 ©25° C., acid number: 40.1-51.5 meq KOH/g, total acid: 7-9 wt.-%; microstructure (molar % of butadiene): 20-35% 1,2-vinyl functional groups), available under the trade name RICON® 130MA8.

Powder 1

Powder 1 is a surface-reacted calcium carbonate composed of 80% hydroxyapatite and 20% calcite as measured by XRD analysis (BET=85 m²/g, $d_{50}$ (vol)=6.1 μm, $d_{98}$ (vol)=13.8 µm, total intra particle intruded specific pore volume 0.004-0.43 µm=1.28 cm$^3$ g$^{-1}$), prepared with the following method:

In a mixing vessel, 350 liters of an aqueous suspension of natural ground calcium carbonate was prepared by adjusting the solids content of a ground marble calcium carbonate from Hustadmarmor, Norway with a particle size distribution of 90 wt.-% less than 2 µm as determined by sedimentation, such that a solids content of 10 wt.-%, based on the total weight of the aqueous suspension, is obtained.

Whilst mixing the suspension, 62 kg of a 30% concentrated phosphoric acid was added to said suspension over a period of 10 minutes at a temperature of 70° C. Finally, after the addition of the phosphoric acid, the slurry was stirred for additional 5 minutes, before removing it from the vessel and drying.

Powder 2

Powder 2 is a surface-reacted calcium carbonate (BET=139 m$^2$/g, $d_{50}$ (vol)=6.1 µm, $d_{98}$ (vol)=14.2 µm, total intra particle intruded specific pore volume 0.004-0.31 µm=1.00 cm$^3$ g$^{-1}$) prepared with the following method:

In a mixing vessel, 350 liters of an aqueous suspension of natural ground calcium carbonate was prepared by adjusting the solids content of a ground marble calcium carbonate from Hustadmarmor, Norway with a particle size distribution of 90 wt.-% less than 2 µm as determined by sedimentation, such that a solids content of 10 wt.-%, based on the total weight of the aqueous suspension, is obtained.

Whilst mixing the suspension, 62 kg of a 30% concentrated phosphoric acid was added to said suspension over a period of 10 minutes at a temperature of 70° C. Additionally, during the phosphoric acid addition, 1.9 kg of citric acid was added rapidly (about 30 s) to the slurry. Finally, after the addition of the phosphoric acid, the slurry was stirred for additional 5 minutes, before removing it from the vessel and drying.

Powder 3

Powder 3 has been prepared by surface-treating powder 1 with 5 wt.-% of treatment A. To carry out the treatment, the treatment agent (35 g) was first dispersed in 300 mL of deionized water, heated to 60° C. and neutralized to pH 10 with NaOH solution.

A suspension of powder 1 (700 g in 6 L deionized water) was prepared in a 10 L ESCO batch reactor and heated to 85° C. The pH was adjusted to 10 with Ca(OH)$_2$ and the neutralized treatment agent was then added under vigorous stirring. Mixing was continued at 85° C. for 45 minutes, and the suspension was then filtered on a Büchner funnel and dried overnight in an oven (110° C.). The dried filter cake was then deagglomerated using a Retsch SR300 rotor beater mill (total intra particle intruded specific pore volume 0.004-0.43 µm=1.06 cm$^3$ g$^{-1}$).

Powder 4

Powder 4 has been prepared by surface-treating powder 1 with 7.5 wt.-% of treatment A. To carry out the treatment, the treatment agent (37.5 g) was first dispersed in 200 mL of deionized water, heated to 60° C. and neutralized to pH 10 with NaOH solution.

A suspension of powder 1 (500 g in 6 L deionized water) was prepared in a 10 L ESCO batch reactor and heated to 85° C. The pH was adjusted to 10 with Ca(OH)$_2$ and the neutralized treatment agent was then added under vigorous stirring. Mixing was continued at 85° C. for 45 minutes, and the suspension was then filtered on a Büchner funnel and dried overnight in an oven (110° C.). The dried filter cake was then deagglomerated using a Retsch SR300 rotor beater mill (total intra particle intruded specific pore volume 0.004-0.43 µm=1.07 cm$^3$ g$^{-1}$).

Powder 5

Powder 5 has been prepared by surface-treating powder 2 with 5 wt.-% of treatment A. To carry out the treatment, the treatment agent (35 g) was first dispersed in 300 mL of deionized water, heated to 60° C. and neutralized to pH 10 with NaOH solution.

A suspension of powder 2 (700 g in 7 L deionized water) was prepared in a 10 L ESCO batch reactor and heated to 85° C. The pH was adjusted to 10 with Ca(OH)$_2$ and the neutralized treatment agent was then added under vigorous stirring. Mixing was continued at 85° C. for 45 minutes, and the suspension was then filtered on a Büchner funnel and dried overnight in an oven (110° C.). The dried filter cake was then deagglomerated using a Retsch SR300 rotor beater mill (total intra particle intruded specific pore volume 0.004-0.27 µm=0.85 cm$^3$ g$^{-1}$).

Powder 6

Powder 6 has been prepared by grinding powder 2 in a Dyno-mill grinder and then surface-treating it with 5 wt.-% of treatment A. To carry out the treatment, 800 g of this powder was placed in a high speed mixer (Somakon MP-LB Mixer, Somakon Verfahrenstechnik, Germany), and conditioned by stirring for 5 minutes (700 rpm, 120° C.). After that time, 5 wt.-% of treatment A (40 g) was added to the mixture. Stirring and heating was then continued for another 15 minutes (120° C., 700 rpm). After that time, the mixture was allowed to cool and the free-flowing powder was collected (powder 6, BET specific surface area=101.2 m$^2$/g, $d_{50}$ (vol)=5.9 µm; $d_{98}$ (vol)=13 µm, total intra particle intruded specific pore volume 0.004-0.04 µm=0.323 cm$^3$ g$^{-1}$).

Powder 7

Powder 7 is a precipitated hydromagnesite (BET specific surface area=46.7 m$^2$/g, $d_{50}$ (vol)=8.75 µm; $d_{98}$ (vol)=29 µm, total intra particle intruded specific pore volume 0.004-0.53 µm=1.188 cm$^3$ g$^{-1}$)

Powder 8

Powder 8 has been prepared by surface-treating powder 7 with 5 wt.-% of treatment A. To carry out the treatment, the treatment agent (35 g) was first dispersed in 400 mL of deionized water, heated to 60° C. and neutralized to pH 10 with NaOH solution. A suspension of powder 7 (700 g in 6 L deionized water) was prepared in a 10 L ESCO batch reactor and heated to 85° C. The pH was adjusted to 10 with Ca(OH)$_2$ and the neutralized treatment agent was then added under vigorous stirring. Mixing was continued at 85° C. for 45 minutes, and the suspension was then filtered on a filter press and dried overnight in an oven (110° C.). The dried filter cake was then deagglomerated using a Retsch SR300 rotor beater mill (total intra particle intruded specific pore volume 0.004-0.48 µm=1.082 cm$^3$ g$^{-1}$)

Powder 9

Powder 9 has been produced through wet grinding of powder 7 (BET specific surface area=46.5 m$^2$/g, $d_{50}$ (vol)=7.9 µm; $d_{98}$ (vol)=27 µm).

Powder 10

Powder 10 is an untreated precipitated hydromagnesite (BET specific surface area=42.7 m$^2$/g, $d_{50}$ (vol)=11.6 µm; $d_{98}$ (vol)=47 µm, total intra particle intruded specific pore volume 0.004-0.31 µm=0.507 cm$^3$ g$^{-1}$), obtainable by the method as described in WO2011054831 A1.

Powder 11

Powder 11 is an untreated precipitated hydromagnesite (BET specific surface area=70.1 m$^2$/g, $d_{50}$ (vol)=6.3 µm; $d_{98}$ (vol)=70 μm, total intra particle intruded specific pore volume 0.004-0.43 μm=0.983 cm³ g⁻¹).

Powder CE1 (Comparative)

Powder CE1 is a N550 carbon black filler obtained from Orion engineered Carbons GmbH (Purex® HS 45, iodine number: 43±5 mg/g; STSA surface area (according to ASTM D 6556): 39±5 m²/g).

Powder CE2 (Comparative)

Powder CE2 is a surface-treated ultrafine ground calcium carbonate (BET specific surface area: 44.1 m²/g).

Elastomer Compounding

Examples Series 1: EPDM Elastomer Composition

Step 1—Internal Mixing

As a first step, each batch were mixed in a HAAKE internal mixer with 300 cm³ capacity equipped with Banbury rotors. The temperature was set at 40° C. at the beginning of each mixing, during the process the temperature raised up to 90° C., depending on the filler being incorporated. The following process had been used for each batch (Table 4):

TABLE 4

Internal mixing procedure.

| Time (min) | Operation | Speed (rpm) |
|---|---|---|
| t = 0 | Introduction of elastomer precursor and mineral filler (40° C.) | 40 |
| t = 1 | Insertion of carbon black and oil | 40 |
| t = 5 | Dumping of the mixture | 40 |

Step 2—External Mixing

For the second step, mixing with the peroxide crosslinking agent was performed on a cylinder mixer (150×350). All the elastomer precursors were mixed with the same times, cylinder speeds, and cylinder spacing. The cooling system was set to 25° C. and the metal guides were set as to allow the elastomer precursor to occupy 70% of the cylinder surface. In between two accelerations the cylinders are cleaned and are let cool. The detail proceedings for this process are described in Table 5 below.

TABLE 5

External mixing procedure.

| Time (min) | Operation | Cylinder Spacing (mm) |
|---|---|---|
| t = 0 | Introduction of the mix from Step 1 | 1 |
| t = 2 | Insertion of the crosslinking system | 1 |
| t = 6 | 5 thin passings | 0.6 |
| | Calendering sheet, thickness 2 mm | 2 |

Step 3—Compression Molding

Sheets of the elastomer composition were produced by compression molding at 160 or 180° C. and 100 kgf/cm pressure. This way, small 150×150×2 mm sheets were prepared. The crosslinking time, which determines the molding time, was determined through a rheological MDR test.

EPDM Elastomer Compositions

The following elastomer compositions of Table 6 were obtained following the method described above. All elastomer compositions had an isovolumic amount of fillers. All fillers were coupled 50/50% with carbon black in volume. Therefore the carbon black reference batch contains 100 phr of N550. The other batches contain 50 phr of N550 and a slightly variable amount of mineral filler in function of their density, in order to have an amount of mineral filler equivalent to the volume of 50 phr of carbon black (indicated in Table 6 with an asterisk).

TABLE 6

EPDM elastomer compositions

| Example | EPDM-E3 | EPDM-E4 | EPDM-E5 | EPDM-CE1 |
|---|---|---|---|---|
| EPDM Vistalon 2504 from Exxon Mobil (phr) | 100 | 100 | 100 | 100 |
| Powder 3 (phr) | 72* | | | |
| Powder 4 (phr) | | 70* | | |
| Powder 5 (phr) | | | 68* | |
| Powder CE1 (phr) | 50 | 50 | 50 | 100 |
| Torilis 6200 plasticizer (phr) | 10 | 10 | 10 | 10 |
| Peroxide DC40 crosslinking agent (phr) | 7 | 7 | 7 | 7 |
| Rhenogran TAC 50% crosslinking coagent (phr) | 2 | 2 | 2 | 2 |

The obtained elastomer compositions had the following properties.

TABLE 7

Shore A hardness of the elastomer compositions.

| Sample | Hardness (Shore A) |
|---|---|
| EPDM-E3 | 86 |
| EPDM-E4 | 89 |
| EPDM-E5 | 85 |
| EPDM-CE1 | 81 |

TABLE 8

Effect on tear resistance in EPDM:

| Sample | DELFT (MPa) |
|---|---|
| EPDM-E3 | 35.4 |
| EPDM-E4 | 34.8 |
| EPDM-E5 | 30.9 |
| EPDM-CE1 | 24.9 |

TABLE 9

Effect on air permeability in EPDM:

| Sample | Air permeability (m² · Pa⁻¹ · s⁻¹)/ 60° C. & 4 bars |
|---|---|
| EPDM-E3 | 1.46E−16 |
| EPDM-E4 | 1.47E−16 |
| EPDM-E5 | 1.42E−16 |
| EPDM-CE1 | 1.76E−16 |

Example Series 2: NBR Elastomer Compositions

The following elastomer compositions of Table 10 were obtained following the method described above. All elastomer compositions had an isovolumic amount of fillers. All fillers were coupled 50/50% with carbon black in volume. Therefore the carbon black reference batch contains 40 phr of N550. The other batches contain 20 phr of N550 and a slightly variable amount of mineral filler in function of its density, in order to have an amount of mineral filler equivalent to the volume of 20 phr of carbon black (indicated in Table 10 with an asterisk).

TABLE 10

NBR elastomer compositions.

| Example | NBR-E3 | NBR-E4 | NBR-E5 | NBR-CE1 |
|---|---|---|---|---|
| NBR Perbunan P3445 from Arlanxeo (phr) | 100 | 100 | 100 | 100 |
| Powder 3 (phr) | 29* | | | |
| Powder 4 (phr) | | 28* | | |
| Powder 5 (phr) | | | 27* | |
| Powder CE1 (phr) | 20 | 20 | 20 | 40 |
| Diisononyl phthalate plasticizer (phr) | 5 | 5 | 5 | 5 |
| Peroxide DC40 crosslinking agent (phr) | 7 | 7 | 7 | 7 |
| Rhenogran TAC 50% crosslinking coagent (phr) | 2 | 2 | 2 | 2 |

The obtained elastomer compositions had the following properties.

TABLE 11

Effect on Hardness in NBR elastomer compositions:

| Sample | Hardness (Shore A) |
|---|---|
| NBR-E3 | 72 |
| NBR-E4 | 74 |
| NBR-E5 | 74 |
| NBR-CE1 | 69 |

TABLE 12

Effect on air permeability in NBR elastomer compositions:

| Sample | Air permeability $(m^2 \cdot Pa^{-1} \cdot s^{-1})/$ 60° C. & 4 bars |
|---|---|
| NBR-E3 | 1.75E−17 |
| NBR-E4 | 1.68E−17 |
| NBR-E5 | 1.75E−17 |
| NBR-CE1 | 1.97E−17 |

The examples show that the inventive fillers were able to reduce the air permeability of the inventive elastomer compositions. The effect is also observed, when the filler is not used in addition to another filler, but also when replacing part of the (carbon black) filler in the elastomer composition. At the same time, the inventive elastomer compositions exhibit an increased hardness, compared to an elastomer composition not containing the inventive filler. Thus, the use of the inventive fillers allows for improving the mechanical properties while at the same time reducing the gas permeability of an elastomer composition.

Examples Series 3: EPDM Elastomer Composition

Step 1—Internal Mixing

As a first step, each batch were mixed in a 2 L Banbury internal mixer. The temperature was set at 40° C. at the beginning of each mixing, during the process the temperature raised up to 150° C., depending on the filler being incorporated. The following process had been used for each batch (Table 13):

TABLE 13

Internal mixing procedure.

| Time (min:s) | Operation | Speed (rpm) |
|---|---|---|
| t = 00:00 | Introduction of EPDM | 50 |
| t = 00:50 | Addition of the filler | 50 |
| t = 02:30 | Addition of 2/3 of Powder CE1 | 50 |
| t = 05:30 | Addition of 1/3 of Powder CE1 + paraffinic oil | 50 |
| t = 06:30 | Ram cleaning | 50 |
| t = 08:30 | Dropping | 50 |

Step 2—External Mixing

For the second step, mixing with the peroxide crosslinking agent was performed on a cylinder mixer (300×700). All the elastomer precursors were mixed with the same times, cylinder speeds, and cylinder spacing. The cooling system was set to 40° C. and the metal guides were set as to allow the elastomer precursor to occupy 70% of the cylinder surface. The detail proceedings for this process are described in Table 14 below.

TABLE 14

External mixing procedure.

| Time (min:s) | Operation | Cylinder Spacing (mm) |
|---|---|---|
| t = 00:00 | Introduction of the mix from Step 1 | 2.5 |
| t = 01:30 | Insertion of the crosslinking system | 2.5 |
| t = 06:00 | 3 thin passes | 0.5 |
| | Calendering sheet, thickness 2 mm | 2 |

Step 3—Compression Molding

Sheets of the elastomer composition were produced by compression molding at 180° C. and 200 bar pressure. This way, small 300×300×2 mm plates were made. The curing time, which determines the molding time, was determined through a rheological test in MDR. The T98 was taken as time of curing for the press plates. The fabrication of the compression set test specimens was done with the same procedure, meaning by compression molding. The curing time used was the addition of 10 min to the T98 as the thickness of these test specimens is higher than the press plates.

EPDM Elastomer Compositions

The following elastomer compositions of Table 15 were obtained following the method described above. All elastomer compositions had an isovolumic amount of fillers. All fillers were coupled 50/50% with carbon black in volume. Therefore the carbon black reference batch contains 100 phr of N550. The other batches contain 50 phr of N550 and a slightly variable amount of mineral filler in function of their density, in order to have an amount of mineral filler equivalent to the volume of 50 phr of carbon black (indicated in Table 15 with an asterisk).

TABLE 15

EPDM elastomer compositions

| Example | EPDM-CE1 bis | EPDM-CE2 | EPDM-E6 | EPDM-E8 | EPDM-E9 | EPDM-E10 | EPDM-E11 |
|---|---|---|---|---|---|---|---|
| EPDM Vistalon 2504N from Exxon Mobil (phr) | 100 | 100 | 100 | 100 | 100 | 100 | 100 |
| Carbon black - N550 (Powder CE1) | 100 | 50 | 50 | 50 | 50 | 50 | 50 |
| Powder CE2 | | 60.3* | | | | | |
| Powder 6 | | | 72.5* | | | | |
| Powder 8 | | | | 60.8* | | | |
| Powder 9 | | | | | 61.4* | | |
| Powder 10 | | | | | | 61.1* | |
| Powder 11 | | | | | | | 72.2* |
| Torilis 6200 plasticizer (phr) | 10 | 10 | 10 | 10 | 10 | 10 | 10 |
| Peroxide DC40 crosslinking agent (phr) | 7 | 7 | 7 | 7 | 7 | 7 | 7 |
| Rhenogran TAC 50% crosslinking coagent (phr) | 2 | 2 | 2 | 2 | 2 | 2 | 2 |

The obtained elastomer compositions had the following properties.

TABLE 16

Shore A hardness of the elastomer compositions.

| Sample | Hardness (Shore A) |
|---|---|
| EPDM-CE1 bis | 79.1 |
| EPDM-CE2 | 70.8 |
| EPDM-E6 | 82.9 |
| EPDM-E8 | 83.1 |
| EPDM-E9 | 81.4 |
| EPDM-E10 | 80.4 |
| EPDM-E11 | 82.2 |

It can be seen that the shore A hardness is improved with the inventive fillers.

TABLE 17

Effect on tensile modulus (M50—modulus at 50% elongation)

| Sample | M50 (MPa) |
|---|---|
| EPDM-CE1 bis | 3.7 |
| EPDM-CE2 | 1.9 |
| EPDM-E6 | 4.5 |
| EPDM-E8 | 4.4 |
| EPDM-E9 | 3.5 |
| EPDM-E10 | 4.2 |
| EPDM-E11 | 3.7 |

Furthermore, the M50 modulus is maintained or improved with the inventive fillers.

TABLE 18

Effect on air permeability in EPDM:

| Sample | Air permeability $(m^2 \cdot Pa^{-1} \cdot s^{-1})$/ 60° C. & 4 bars |
|---|---|
| EPDM-CE1 bis | 1.88E−16 |
| EPDM-CE2 | 2.07E−16 |
| EPDM-E6 | 1.62E−16 |
| EPDM-E8 | 1.52E−16 |
| EPDM-E9 | 1.70E−16 |
| EPDM-E10 | 1.62E−16 |
| EPDM-E11 | 1.46E−16 |

All inventive fillers induce a lower air permeability into the elastomer compositions, compared to the comparative fillers.

The invention claimed is:

1. A process for the preparation of an elastomer composition having a reduced gas permeability, the process comprising:
    crosslinking a precursor composition to form the elastomer composition, the precursor composition comprising:
        a crosslinkable polymer; and
        a porous filler comprising a filler material selected from the group consisting of surface-reacted calcium carbonate, precipitated hydromagnesite and mixtures thereof, and
        a further filler,
    wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source and mixtures thereof, and
    wherein a volume ratio of the porous filler to the further filler is in the range from 10:90 to 90:10.

2. The process of claim 1, wherein the filler material has a BET specific surface area from 20 to 200 m²/g; or a volume median particle size $d_{50}$ from 0.1 to 75 μm; or a volume top cut particle size $d_{98}$ from 0.2 to 150 μm; or an intra-particle intruded specific pore volume in the range from 0.1 to 3.0 cm³/g, determined by mercury porosimetry measurement.

3. The process of claim 1, wherein the porous filler further comprises a surface-treatment layer on at least a part of the surface of the filler material, wherein the surface-treatment layer is formed by contacting the filler material with a surface-treatment composition in an amount from 0.07 to 9 mg/m² of the filler material surface.

4. The process of claim 3, wherein the surface-treatment composition comprises at least one unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof.

5. The process of claim 3, wherein the surface-treatment composition comprises at least one saturated surface-treatment agent selected from the group consisting of
I) a phosphoric acid ester blend of one or more phosphoric acid mono-ester and/or salts thereof and/or one or more phosphoric acid di-ester and salts thereof,
II) at least one saturated aliphatic linear or branched carboxylic acid and salts thereof,
III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and salts thereof,
IV) at least one polydialkylsiloxane,
V) at least one trialkoxysilane, and
VI) mixtures of the materials according to I) to V).

6. The process of claim 1, wherein the crosslinkable polymer is selected from the group consisting of ethylene-propylene rubber, ethylene-propylene-diene rubber, nitrile-butadiene rubber, acrylonitrile-butadiene rubber, butyl rubber, styrene-butadiene rubber, polyisoprene, hydrogenated nitrile-butadiene rubber, polychloroprene, isobutene-isoprene rubber, chloro-isobutene-isoprene rubber, brominated isobutylene-isoprene rubber, acrylic rubbers, butadiene rubbers, epichlorhydrin rubbers, silicone rubbers, fluorocarbon rubbers, polyurethane rubbers, polysulfide rubbers, thermoplastic rubbers, and mixtures thereof.

7. The process of claim 1, wherein the porous filler is contained in the precursor composition in an amount in the range from 5 to 175 parts per hundred (phr) based on the total weight of the crosslinkable polymer in the precursor composition.

8. The process of claim 1, wherein the precursor composition further comprises an additive.

9. The process of claim 1, wherein
a) the Shore A hardness of the elastomer composition is increased by at least 3% compared to the same elastomer composition, wherein the porous filler is replaced by carbon black in an isovolumic amount, and/or
b) the air permeability is decreased by at least 5% compared to the same elastomer composition, wherein the porous filler is replaced by carbon black in an isovolumic amount,
wherein the carbon black has a statistical thickness surface area (STSA) of 39±5 m²/g, measured according to ASTM D 6556-19, and
wherein the Shore A hardness is measured according to NF ISO 7619-1:2010 and the air permeability is measured according to NF ISO 2782-1:2018.

10. A process for the preparation of an elastomer composition having a reduced gas permeability, the process comprising the steps of
a) providing a crosslinkable polymer,
b) providing a porous filler comprising a filler material selected from the group consisting of surface-reacted calcium carbonate, precipitated hydromagnesite and mixtures thereof,
wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source and mixtures thereof,
c) providing a further filler,
d) mixing, in any order, the crosslinkable polymer of step a), the porous filler of step b) and the further filler of step c) to form a mixture, wherein a volume ratio of the porous filler to the further filler is in the range from 10:90 to 90:10, and
e) crosslinking the mixture obtained in step d) to form the elastomer composition having a reduced gas permeability.

11. The process of claim 10, wherein the porous filler further comprises a surface-treatment layer on at least a part of the surface of the filler material, wherein the surface-treatment layer is formed by contacting the filler material with a surface-treatment composition in an amount from 0.07 to 9 mg/m² of the filler material surface.

12. The process of claim 10, wherein crosslinking step e) is performed by
i) the addition of a crosslinking agent and a crosslinking coagent, and subsequent thermal crosslinking at a temperature of at least 100° C., optionally in combination with compression molding at a pressure of at least 100 bar, and/or
ii) curing by ultraviolet light radiation, electron-beam radiation, nuclear radiation, gamma radiation, microwave radiation and/or ultrasonic radiation.

13. An elastomer composition having a reduced gas permeability formed from a composition comprising
a crosslinkable polymer,
a porous filler comprising a filler material selected from the group consisting of surface-reacted calcium carbonate, precipitated hydromagnesite and mixtures thereof, and
a further filler,
wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source and mixtures thereof, and
wherein a volume ratio of the porous filler to the further filler is in the range from 10:90 to 90:10.

14. An article comprising the elastomer composition of claim 13, wherein the article is selected from the group consisting of tubeless articles, membranes, sealings, O-rings, gloves, pipes, cables, electrical connectors, oil hoses, balls and shoe soles.

15. The process of claim 2, wherein the filler material has a BET specific surface area from 20 to 200 m²/g.

16. The process of claim 2, wherein the filler material has a volume median particle size $d_{50}$ from 0.1 to 75 μm.

17. The process of claim 2, wherein the filler material has a volume top cut particle size $d_{98}$ from 0.2 to 150 μm.

18. The process of claim 2, wherein the filler material has an intra-particle intruded specific pore volume in the range from 0.1 to 3.0 cm³/g.

19. The elastomer composition of claim 13, wherein the filler material has
- a BET specific surface area from 20 to 200 m²/g; and/or
- a volume median particle size $d_{50}$ from 0.1 to 75 μm; and/or
- a volume top cut particle size $d_{98}$ from 0.2 to 150 μm; and/or
- an intra-particle intruded specific pore volume in the range from 0.1 to 3.0 cm³/g, determined by mercury porosimetry measurement.

20. The elastomer composition of claim 13, wherein the porous filler further comprises a surface-treatment layer on at least a part of the surface of the filler material, wherein the surface-treatment layer is formed by contacting the filler material with a surface-treatment composition in an amount from 0.07 to 9 mg/m² of the filler material surface.

21. The elastomer composition of claim 20, wherein the surface-treatment composition comprises at least one unsaturated surface-treatment agent selected from the group consisting of mono- or di-substituted succinic anhydride containing compounds comprising unsaturated carbon moieties, mono- or di-substituted succinic acid containing compounds comprising unsaturated carbon moieties, mono- or di-substituted succinic acid salts containing compounds comprising unsaturated carbon moieties, unsaturated fatty acids, salts of unsaturated fatty acids, unsaturated esters of phosphoric acid, salts of unsaturated phosphoric acid esters, abietic acid, salts of abietic acid, trialkoxysilanes comprising unsaturated carbon moieties and mixtures thereof.

22. The elastomer composition of claim 20, wherein the surface-treatment composition comprises at least one saturated surface-treatment agent selected from the group consisting of
- I) a phosphoric acid ester blend of one or more phosphoric acid mono-ester and/or salts thereof and/or one or more phosphoric acid di-ester and salts thereof,
- II) at least one saturated aliphatic linear or branched carboxylic acid and salts thereof,
- III) at least one mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and salts thereof,
- IV) at least one polydialkylsiloxane,
- V) at least one trialkoxysilane, and
- VI) mixtures of the materials according to I) to V).

23. The elastomer composition of claim 13, wherein the crosslinkable polymer is selected from the group consisting of ethylene-propylene rubber, ethylene-propylene-diene rubber, nitrile-butadiene rubber, acrylonitrile-butadiene rubber, butyl rubber, styrene-butadiene rubber, polyisoprene, hydrogenated nitrile-butadiene rubber, polychloroprene, isobutene-isoprene rubber, chloro-isobutene-isoprene rubber, brominated isobutylene-isoprene rubber, acrylic rubbers, butadiene rubbers, epichlorhydrin rubbers, silicone rubbers, fluorocarbon rubbers, polyurethane rubbers, polysulfide rubbers, thermoplastic rubbers, and mixtures thereof.

24. The elastomer composition of claim 13, wherein the porous filler is contained in the composition in an amount in the range from 5 to 175 parts per hundred (phr) based on the total weight of the crosslinkable polymer in the composition.

25. The elastomer composition of claim 13, wherein the composition further comprises an additive.

* * * * *